US007916771B2

(12) United States Patent
Julien et al.

(10) Patent No.: US 7,916,771 B2
(45) Date of Patent: Mar. 29, 2011

(54) BOC SIGNAL ACQUISITION AND TRACKING METHOD AND APPARATUS

(75) Inventors: Olivier Julien, Calgary (CA);
Christophe Macabiau, Toulouse (FR);
M. Elizabeth Cannon, Calgary (CA);
Gerard Lachapelle, Calgary (CA)

(73) Assignees: UTI Limited Partnership, Calgary (CA); Ecole Nationale de l'Aviation Civile, Toulousse (FR)

( * ) Notice: Subject to any disclaimer, the term of this patent is extended or adjusted under 35 U.S.C. 154(b) by 1353 days.

(21) Appl. No.: 11/129,482

(22) Filed: May 16, 2005

(65) Prior Publication Data

US 2005/0270997 A1    Dec. 8, 2005

Related U.S. Application Data

(60) Provisional application No. 60/571,496, filed on May 17, 2004.

(51) Int. Cl.
*H04B 1/00* (2006.01)
*G01S 1/00* (2006.01)

(52) U.S. Cl. ............. 375/145; 342/357.22; 342/357.39; 375/346

(58) Field of Classification Search ........... 342/350, 342/352, 357.01, 357.06–357.15; 375/130, 375/140–145, 346
See application file for complete search history.

(56) References Cited

U.S. PATENT DOCUMENTS 6,580,750 B2 *   6/2003  Aue ........................... 375/150
7,295,635 B2 * 11/2007  Coatantiec et al. ......... 375/346

2003/0204309 A1   10/2003  Soellner
2003/0231580 A1 * 12/2003  Martin et al. ................ 370/203
2004/0071200 A1 *  4/2004  Betz et al. .................... 375/152

OTHER PUBLICATIONS

Fante, R.L., "Unambiguous Tracker for GPS Binary-Offset-Carrier Signals" ION 59, Jun. 25, 2003 pp. 141-145, XP002338821, New Mexico.
Lin, V.S., et al. "Study of the Impact of False Lock Points in Subcarrier Modulated Ranging Signals and Recommended Mitigation Approaches", ION 59, Jun. 25, 2003 pp. 156-165, XP.
Ward, Phillip W., "A Design Technique to Remove the Correlatin Ambiguity in Binary Offset Carrier (BOC) Spread Spectrum Signals", ION NTM 2004, Jan. 28, 2004 pp. 886-896, XP00233.
Martin, N., et al., "BOC (x,y) Signal Acquisition Techniques and Performances", ION GPS/GNSS 2003, Dec. 9, 2003, pp. 188-198, XP002338824, Portland, OR.
Bastide, F., O. Julien, C. Macabiau, and B. Roturier (2002), Analysis of L5/E5 Acquisition, Tracking and Data Demodulation Thresholds, Proceedings of U.S. Institute of Navigation GPS (Portland, OR, USA, Sep. 24-27), pp. 2196-2207.
Betz, J.W. (2002), Binary Offset Carrier Modulations for Radionavigation, Navigation, Journal of the Institute of Navigation, Winter 2001-2002, vol. 48, No. 4, pp. 227-246.
Fine, P., and W. Wilson (1999), Tracking Algorithm for GPS Offset Carrier Signals, Proceedings of U.S. Institute of Navigation NTM (San Diego, CA, USA, Jan. 25-27), pp. 671-676.
Gibbon, G (2004), Welcome Progress in GNSS Talks, GPS World, February issue. Godet, J., J.C. de Mateo, P. Erhard, and O. Nouvel (2002), Assessing the Radio Frequency Compatibility between GPS and Galileo, Proceedings of U.S. Institute of Navigation GPS (Portland, OR, USA, Sep. 24-27), pp. 1260-1269.
Papoulis, A. (1991), Probability, Random Variables and Stochastic Processes, Third Edition, McGraw Hill International Editions.

* cited by examiner

*Primary Examiner* — David C Payne
*Assistant Examiner* — James M Perez
(74) *Attorney, Agent, or Firm* — Fulbright & Jaworski L.L.P.

(57) ABSTRACT

A method and apparatus for acquiring and tracking a BOC signal in a satellite navigation receiver includes a synthesized acquisition test function or a discriminator for code delay provided by combining a BOC autocorrelation function and a BOC/PRN cross-correlation function.

16 Claims, 11 Drawing Sheets

BOC SIGNAL ACQUISITION AND TRACKING METHOD AND APPARATUS

FIELD OF THE INVENTION

The present invention relates to a method and apparatus for acquiring and tracking a Binary Offset Carrier (BOC) signal as part of a satellite navigation receiver.

BACKGROUND OF THE INVENTION

The vast majority of satellite navigation applications are currently based on the Global Positioning System (GPS) controlled by the United States Departments of Defense and Transportation. This scenario will significantly change with the advent of GALILEO.

GALILEO is a European initiative for a global navigation satellite system (GNSS), providing a highly accurate global positioning service under civilian control. While providing autonomous navigation and positioning services, GALILEO will be interoperable with GPS and GLONASS, another global satellite navigation system. A user will be able to take a position with the same receiver from any of the satellites in any combination. By offering dual frequencies as standard, however, GALILEO may deliver real-time positioning accuracy down to the metre range. It will strive to guarantee availability of the service under all but the most extreme circumstances and will inform users within seconds of a failure of any satellite. This will make it suitable for applications where safety is crucial, such as running trains, guiding cars and landing aircraft. The combined use of GALILEO and other GNSS systems may offer much improved performance for all kinds of user communities.

In the new generation of GNSSs, attention has been given to have efficient and spectrally relevant signals. GALILEO and GPS will share two central frequencies and will both send several signals on the same carriers. Consequently, new signal modulations had to be studied to minimize inter- and intra-system interference. One modulation emerged due to its split spectrum that spectrally isolates the signal from the currently used Bi-Phased Shift Keying (BPSK) modulation [Godet et al., 2002; Betz, 2002]. This new modulation is known as Binary Offset Carrier (BOC). The BOC modulation is part of the GALILEO signal plan.

As used herein, "BOC" refers to a signal resulting from a modulation which multiplies a pseudo-random noise (PRN) spreading code with a square wave sub-carrier (SC) that has a frequency multiple of the code rate. It creates a symmetric split spectrum with two main lobes shifted from the center frequency by the frequency of the sub-carrier. The properties of a BOC signal are dependent on the spreading code chip rate, the sub-carrier frequency, and the sub-carrier phasing within one PRN code chip. The common notation for BOC-modulated signals in the GNSS field is BOC($f_c$,$f_s$) where $f_c$ represents the code chip rate, and $f_s$ is the frequency of the sub-carrier. Both $f_c$ and $f_s$ are usually noted as a multiple of the reference frequency 1.023 MHz. BOC(n,m) may then be expressed as $PRN_{m*fc} \times SC_{n*fc}$.

A BOC signal induces better tracking in white noise and better inherent multipath mitigation compared to the spreading code alone. However, it also makes acquisition more challenging and tracking potentially ambiguous due to its multiple peak autocorrelation function. A summary of the basic properties and improvements brought by BOC signals compared to BPSK signals is given by Betz (2002).

As already mentioned, the presence of a sub-carrier in the BOC signal introduces secondary peaks in the range [−1, +1] chip in BOC autocorrelation. The presence of these secondary peaks may cause a serious problem if the receiver locks onto a side peak instead of the main peak. A significant bias of approximately 150 m would then be present in the range measurements, which is unacceptable for navigation applications.

Several methods have been proposed to track BOC signals without suffering from any potential tracking bias. Fine and Wilson (1999), Lin et al. (2003), Martin et al. (2003) and Ward (2004) are a few examples. They treat the problem of the BOC tracking ambiguity in a broad sense, trying to find a solution that could be applied to any BOC(n,m) signal. Each of these suffers from various disadvantages.

Therefore, there is a need in the art for efficient methods of acquiring and tracking a BOC signal which minimizes potential tracking bias and allows unambiguous tracking of the signal.

SUMMARY OF THE INVENTION

The methods and apparatuses described and claimed herein may apply to any BOC signal. In a preferred embodiment, the BOC signal is a sine-BOC(n,n) and more preferably the BOC signal is a BOC(1,1) signal. The methods utilize a synthesized local correlation function.

Therefore, in one aspect, the invention comprises a method of tracking a BOC signal with a satellite navigation receiver, comprising the steps of:
  (a) receiving a BOC signal;
  (b) generating an internal BOC replica signal;
  (c) generating an internal PRN replica signal;
  (d) providing a discriminator for code delay by combining a BOC autocorrelation function and a BOC/PRN cross-correlation function.

In another aspect, the invention may comprise a method of acquiring a BOC signal with a satellite navigation receiver comprising the steps of:
  (a) receiving a BOC signal;
  (b) generating an internal BOC replica signal;
  (c) generating an internal PRN replica signal;
  (d) obtaining a synthesized acquisition test function by combining a BOC autocorrelation function and a BOC/PRN cross-correlation function;
  (e) if the test realized in (d) is negative, then repeating steps (b) to (d) until the test function is passed or the acquisition process is abandoned.

Preferably, the signal acquisition method is followed by the signal tracking method.

In another aspect, the invention may comprise a satellite navigation receiver capable of acquiring a satellite signal, said receiver comprising:
  (a) an acquisition test function device comprising a signal input, computational means for combining the correlation points of a BOC autocorrelation function and a BOC/PRN cross-correlation function and means for outputting an acquisition test function including a test Doppler frequency and a test code delay;
  (b) a frequency generator comprising a carrier oscillator and a quadrature carrier oscillator, having a test frequency input coupled to the acquisition test function output, and an output coupled to the acquisition test function device signal input; and
  (c) a code generator comprising a code oscillator, a code generator for generating a PRN replica, a sub-carrier generator for generating a sub-carrier replica; wherein the code oscillator receives the test code delay and is coupled to the code generator and the sub-carrier generator, and wherein the code generator and the sub-carrier generator are each coupled to the acquisition test device.

Preferably, the acquisition test function device comprises:

(a) an input channel, (b) first and second secondary channels split from the input channel, (c) first and second tertiary channels split from the first secondary channel, third and fourth tertiary channels split from the second secondary channel, (d) and wherein the carrier oscillator is coupled to the first secondary channel and the quadrature carrier oscillator is coupled to the second secondary channel; and wherein the code generator is coupled to the first tertiary channel and also coupled to the third tertiary channel; and wherein the sub-carrier generator is coupled to the code generator, and the product of the sub-carrier generator and the code generator is coupled to the second tertiary channel and the fourth tertiary channel.

Preferably, the receiver further comprises a code delay estimation device, for tracking an acquired signal using the computational means.

In another aspect, the invention comprises a satellite navigation receiver capable of tracking a satellite signal, said receiver comprising:

(a) a code delay estimation device comprising a signal input, computational means for combining the correlation points of a BOC autocorrelation function and a BOC/PRN cross-correlation function and means for outputting a code delay;

(b) a frequency generator comprising a carrier oscillator and a quadrature carrier oscillator, having a frequency input coupled to an external speed aid, and an output coupled to the code delay estimation device signal input; and (c) a code generator comprising a code oscillator, a code generator for generating a PRN replica, a sub-carrier generator for generating a sub-carrier replica; wherein the code oscillator receives the test code delay and is coupled to the code generator and the sub-carrier generator, and wherein the code generator and the sub-carrier generator are each coupled to the code delay estimation device.

Preferably, the sub-carrier generator generates an early, late and prompt sub-carrier replica and the code generator generates an early, late and prompt PRN replica. In one embodiment, the code delay estimation device comprises:

(a) an input channel, (b) first and second secondary channels split from the input channel, (c) first and second tertiary channels split from the first secondary channel, third and fourth tertiary channels split from the second secondary channel, (d) and wherein the carrier oscillator is coupled to the first secondary channel and the quadrature carrier oscillator is coupled to the second secondary channel; and wherein the code generator is coupled to the first tertiary channel and also coupled to the third tertiary channel; and wherein the sub-carrier generator is coupled to the code generator, and the product of the sub-carrier generator and the code generator is coupled to the second tertiary channel and the fourth tertiary channel.

Preferably, the receiver further comprises an acquisition test function device.

BRIEF DESCRIPTION OF THE DRAWINGS

The invention will now be described with reference to the following diagrams.

DETAILED DESCRIPTION OF THE INVENTION

The present invention relates to a method and an apparatus for acquiring and unambiguously tracking a BOC signal in a satellite navigation receiver. Unless otherwise defined herein, the terms used herein shall have the meaning commonly understood by those skilled in the art.

The following description refers specifically to a sine-BOC (1,1) signal. It is to be understood that the methods of the present invention may be adapted to any BOC signal. This method can be directly extended to any sine-BOC(n,n) signals as all sine-BOC(n,n) share identical correlation properties.

As will be apparent to those skilled in the art, various modifications, adaptations and variations of the specific disclosure which follows can be made without departing from the scope of the invention claimed herein.

1. BOC(1,1) Ranging Ambiguity Issue

Figure 1:
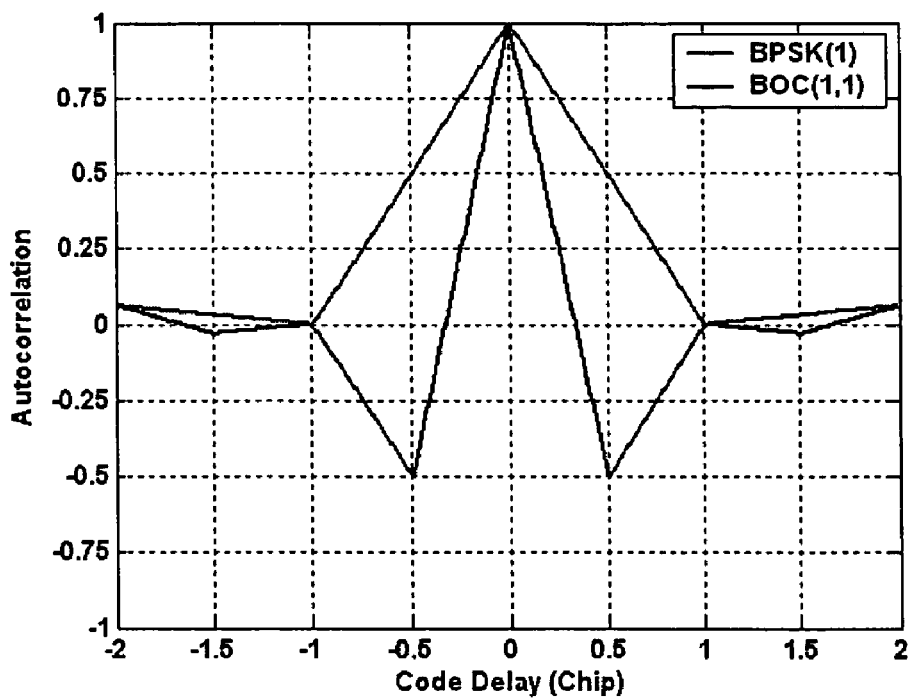
FIG. 1 shows a normalized autocorrelation for BPSK(1) and sine-phased BOC(1,1)

FIG. 1 shows the autocorrelation of a BPSK signal with a 1.023 MHz spreading code rate and a sine-phased BOC(1,1) with the same spreading code. As observed, the BOC autocorrelation presents secondary peaks which can lead to ambiguous acquisition and tracking problems. Although it is well-known that BOC signals have a tracking ambiguity issue, the understanding and quantification of the threat assists in understanding the solution the present invention provides.

Two main but not exclusive sources can lead to a ranging ambiguity when using BOC modulation for ranging:
- A short loss of lock (due to a low $C/N_0$ for instance) followed by lock, after a drift of the code tracking, on a secondary peak (an increase of the $C/N_0$ shortly after the loss of lock)
- An incorrect acquisition that would acquire on the secondary peak of the autocorrelation function and be followed by ambiguous tracking.

As the present invention relates to the unambiguous acquisition and tracking of sine-BOC(n,n) signals, the two issues mentioned above that could lead to a range bias are specifically discussed in the context of a sine-BOC(1,1) signal.

1.1 Tracking Ambiguity

The autocorrelation function of the BOC(n,n) signal with sine phasing, $R_{BOC}$, plotted in FIG. 1, can be written as follows:

$$R_{BOC}(\tau) = tri_0\left(\frac{\tau}{1}\right) - \frac{1}{2}tri_{\frac{1}{2}}\left(\frac{\tau}{1}\right) - \frac{1}{2}tri_{-\frac{1}{2}}\left(\frac{\tau}{1}\right) \quad (1.1)$$

where $$tri_\alpha\left(\frac{x}{y}\right)$$

is the value in x of a triangular function centred in α with a base width of y and a peak magnitude of 1; τ is the code delay in chips.

Assuming that the Delay Lock Loop (DLL) uses an Early-Minus-Late-Power (EMLP) discriminator, the theoretical expression of the discriminator output is:

$$V^{BOC}_{EMLP}(\varepsilon_\tau) = \lfloor\lfloor IE^2_{BOC} + QE^2_{BOC}\rfloor - \lfloor IL^2_{BOC} + QL^2_{BOC}\rfloor\rfloor \quad (1.2)$$

Assuming the code tracking error $\varepsilon_\tau$ is smaller than half the Early-Late spacing $C_S$, and that $C_S$ is smaller than one chip, the EMLP discriminator expression in the central region is given by:

$$V^{BOC}_{EMLP}(\varepsilon_\tau) = \frac{A^2}{4}[18C_S - 12]\varepsilon_\tau \quad (1.3)$$

$$\text{for } -\frac{C_s}{2} \leq \varepsilon_\tau \leq \frac{C_s}{2}$$

where A is the amplitude of the incoming signal.

Normalizing the discriminator is preferred in order to eliminate the dependency of that signal upon the received signal power. The normalization typically used for an EMLP discriminator is:

$$\text{NORM} = \lfloor(IE_{BOC}+IL_{BOC})^2 + (QE_{BOC}+QL_{BOC})^2\rfloor \quad (1.4)$$

As a consequence, assuming a negligible carrier-phase error, the normalized standard sine-BOC(n,n) EMLP discriminator can be expressed as:

$$V^{BOC}_{NORM}(\varepsilon_\tau) = \frac{(2-3C_s)^2 V^{BOC}_{EMLP}(\varepsilon_\tau)}{(18C_s - 12)NORM} \quad (1.5)$$

$$\text{for } -\frac{C_s}{2} \leq \varepsilon_\tau \leq \frac{C_s}{2}$$

Figure 2:
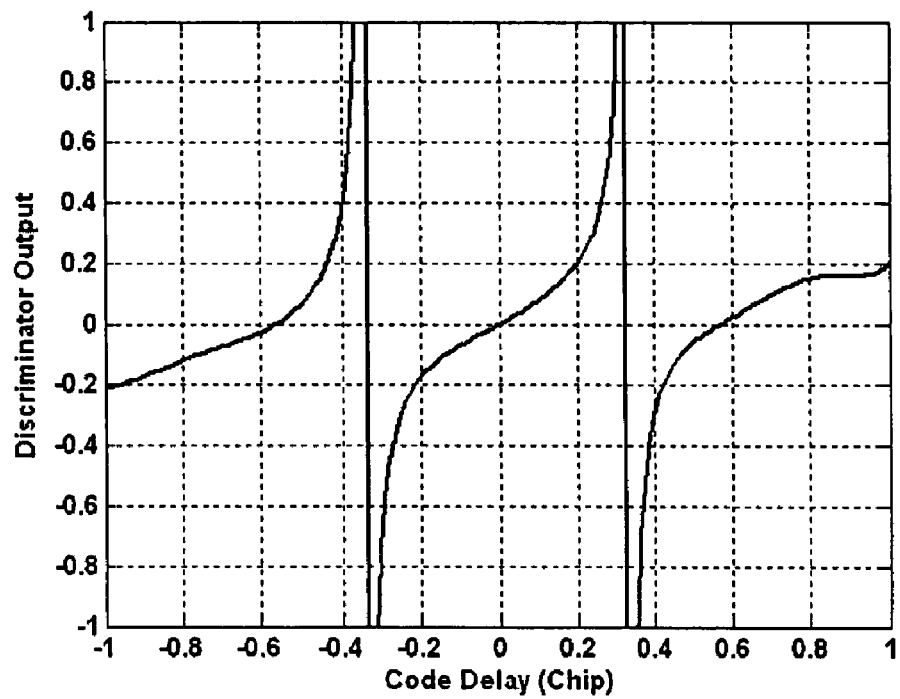
FIG. 2 shows a standard normalized BOC(1,1) Early-Minus-Late-Power discriminator for an early-late spacing of 0.2 Chips (6 MHz Double-sided front-end filter)

FIG. 2 shows the normalized EMLP sine-BOC(1,1) discriminator output for an early-late spacing of 0.2 chips using a 6 MHz double-sided front-end filter. The stability domain is clearly identified around the zero code delay in the [−0.33; 0.33] chip region. However, two other stable lock points can be identified around a code delay of ±0.56 chips. These two false lock points represent the threat of a tracking bias. A code tracking error greater than 0.33 chips would lead to a biased lock.

The two false lock points are not situated exactly at the same code delay as the secondary peak (0.5 chips), but slightly beside due to the different slopes constituting the secondary peaks.

Due to the existence of undesired lock points, high noise or incorrect acquisition that leads to a code delay close to a secondary peak, leads to the possibility of biased tracking.

1.2 Acquisition Ambiguity

Figure 3:
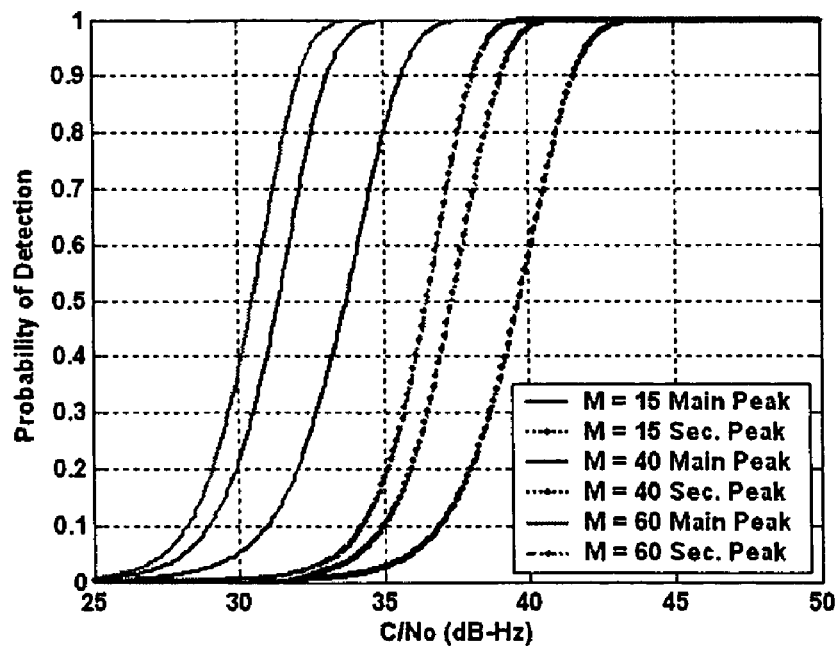
FIG. 3 shows the probability of detection of the main and secondary peaks of the BOC(1,1) signals for 15, 40 and 60 non-coherent summations and coherent integration time of 1 ms

The sine-BOC(1,1) has an autocorrelation function that has secondary peaks with a magnitude of 0.5 relative to its main peak, as seen in FIG. 1. One skilled in the art will realize that this will have an impact on the acquisition performance, as unlike the cross-correlation peaks, this relative magnitude will remain constant whatever the $C/N_0$ value. An analysis based upon the theory described by Bastide et al. (2002) allows visualization of the probability of acquiring on the secondary peak. This method, valid for signals spread by a standard pseudo-random code can be fully used when a sub-carrier modulates the code because the cross-correlation peaks of the BOC signals have the same magnitude as those of the spreading code. In order to set the acquisition thresholds, a probability of false alarm ($P_{fa}$) of $10^{-3}$ has been chosen and an interfering signal with a $C/N_0$ of 45 dB-Hz has been assumed. The computations assumed the same correlation isolation for the spreading code as that of the GPS C/A-code correlation function. FIG. 3 shows the probability of detection of the main and secondary peaks of the BOC(1,1) signals assuming that neither Doppler nor code delay error is present, for a coherent integration time of 1 ms and for 15, 40 and 60 non-coherent summations.

The probabilities of detection of the secondary peaks are offset from the ones of the main peak by 6 dB, which is the difference in the correlation power between the two peaks. It can be observed from FIG. 3 that when the $C/N_0$ reaches 35 to 40 dB-Hz, the secondary peaks can be considered as real threats for acquisition due to its non-negligible probability of detection. The 6 dB difference between the curves corresponding to main and secondary peaks is not the worst case possible. Indeed, the search cells could fall slightly on the side of the main peak and so have a lower probability of detection that the one indicated in FIG. 3 for a given $C/N_0$.

Figure 4:
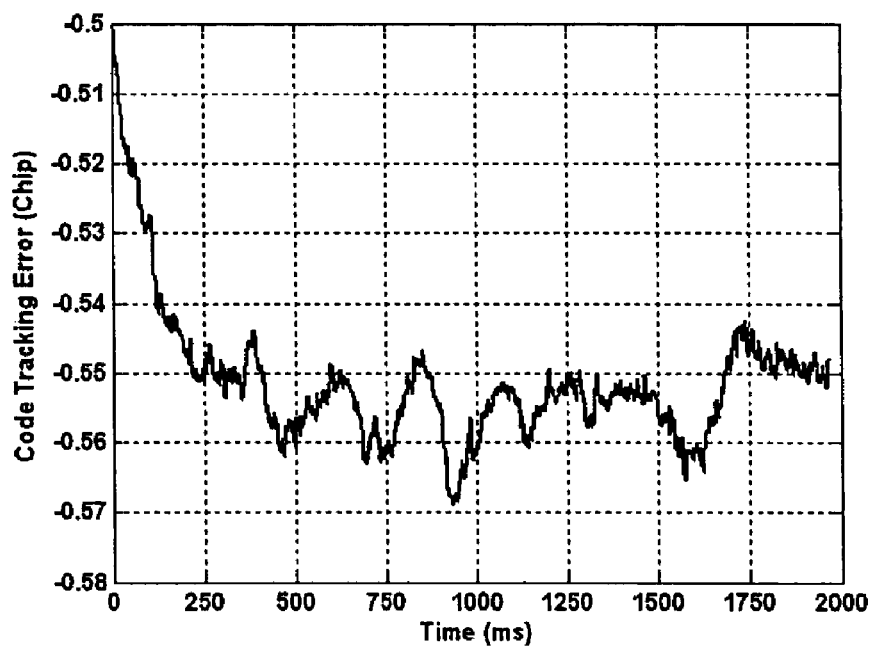
FIG. 4 shows an example of biased BOC(1,1) tracking on false peak with an initial code delay error of −0.5 chips (2 Hz DLL)

FIG. 4 shows the results of a simulation in order to illustrate the problem that the combination of wrong acquisition followed by ambiguous tracking can provide. Using the normalized EMLP discriminator already described, an initial code delay value of 0.5 chips was fed to the tracking loops (assuming correct Doppler). The sine-BOC(1,1) signal was simulated using the GPS C/A-code as its spreading code. The $C/N_0$ was chosen to be 40 dB-Hz, the coherent integration time was 1 ms and the DLL loop filter was set to 2 Hz. As seen in FIG. 4, the DLL clearly locks onto the secondary peak and remains approximately 0.55 chips away from the true delay, confirming the stability of the false lock point.

2.0 The Synthesized Correlation Function

The present invention comprises an unambiguous synthesized correlation function as a solution to the threat created by the sine-BOC(n,n) multi-peak autocorrelation function. Since the false lock points described in section 1 are caused by the secondary peaks of the sine-BOC(n,n) correlation function, the present invention comprises a method to synthesize a correlation function without any side peaks.

In order to acquire and track a satellite signal, a receiver generates local replicas of the code and the carrier, which it then correlates with the received signal. In an initial acquisition phase, the receiver operates in open loop to seek the received signal by testing several assumptions regarding the position and speed of the local code and the local carrier. Once the signal has been acquired, the receiver operates in closed loop.

The discrimination function of the present invention was arrived at by considering the two following correlation functions:

Autocorrelation of sine-BOC(n,n) signals, $R_{BOC}$, whose autocorrelation function is given in equation (1.1), considering an infinite front end filter, Cross-correlation $R_{BOC/PRN}$ of a sine-BOC(n,n) signal with its spreading code PRN (without the sub-carrier), which can be expressed as:

$$R_{BOC/PRN}(\tau) = \frac{1}{2}\left(tri_{-\frac{1}{2}}\left(\frac{\tau}{1}\right) - tri_{\frac{1}{2}}\left(\frac{\tau}{1}\right)\right) \quad (2.1)$$

Figure 5:
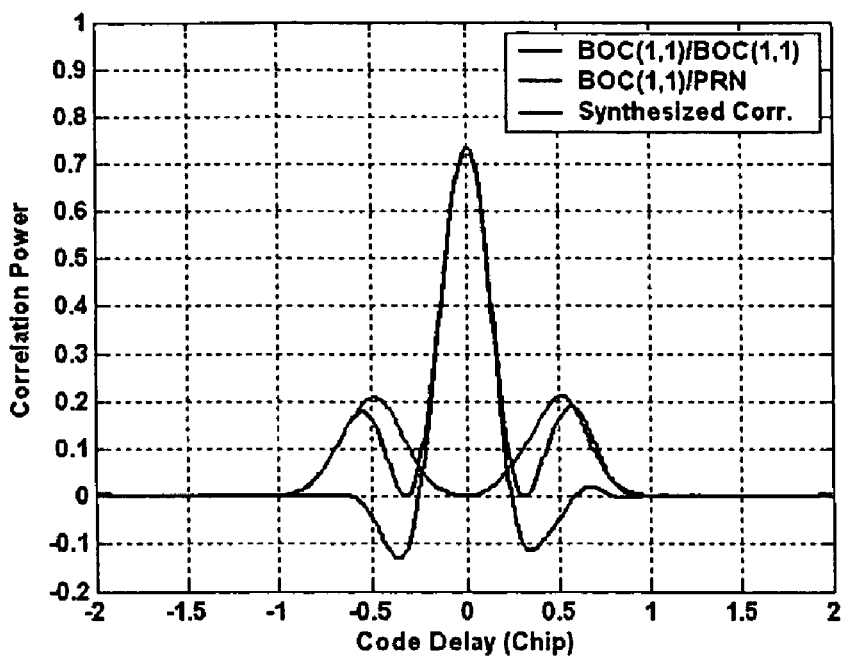
FIG. 5 shows a normalized squared BOC(1,1) autocorrelation, a normalized squared BOC(1,1)/PRN correlation, and synthesized correlation obtained by differencing both (6 MHz Double-Sided Front-End Filter)

As shown in equations (1.1) and (2.1), the side-peaks of the sine-BOC(n,n) autocorrelation have the same absolute magnitude and the same location as the two peaks of the BOC/PRN cross-correlation function. Thus, in general terms, the synthesized correlation function of the present invention is obtained by differencing the squared correlation points of these two functions. FIG. 5 shows the two squared correlation functions using a 6 MHz double-sided filter and the resulting synthesized correlation function. As seen in FIG. 5, the two side-peaks of the BOC(1,1) autocorrelation function are almost completely cancelled. The mismatch is due to the front-end filter that can have a different effect on each correlation function. In order to completely cancel the remainder of the secondary peaks, a coefficient, $\beta$, may be introduced into the combination of the two correlation functions. The synthesized correlation function is then given by:

$$R_{SYN}(\tau) = R_{BOC}^2(\tau) - \beta \times R_{BOC/PRN}^2(\tau) \quad (2.2)$$

Figure 6:
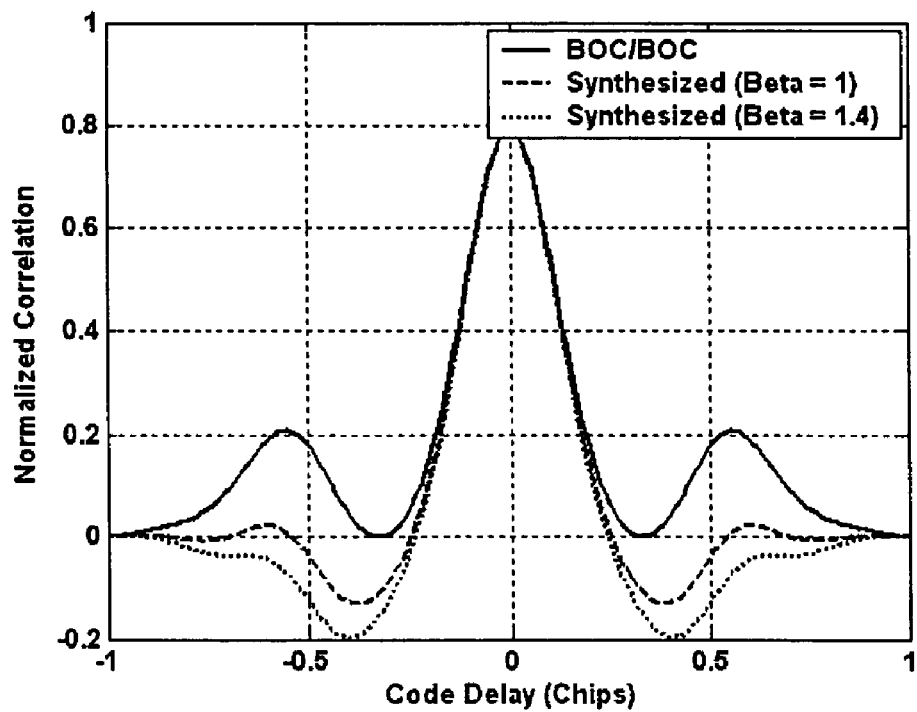
FIG. 6 shows a normalized squared BOC(1,1) autocorrelation, and synthesized correlation functions obtained with Beta=1 and 1.4 (6 MHz Double-Sided Front-End Filter)

The effect of the parameter $\beta$ is shown by FIG. 6. Unless otherwise stated, the coefficient $\beta$ will be assumed to be equal to 1.

The main peak shown in FIG. 5 and FIG. 6 maintains the same sharpness. Two negative side-lobes appear next to the main peak (around ±0.35 chips) due to the unmatched slopes between the two correlation functions initially considered. They bring no threat as potential lock points as they point downwards. The correlation values obtained after 0.5 chips are very close to zero.

The expression for the synthesized correlation function in the case of an infinite front-end bandwidth is obtained by subtracting the square of equations (1.1) and (2.1):

$$R_{SYN}(\tau) = \left(tri_0\left(\frac{\tau}{1}\right)\right)^2 - tri_0\left(\frac{\tau}{1}\right) \times \left[tri_{\frac{1}{2}}\left(\frac{\tau}{1}\right) + tri_{-\frac{1}{2}}\left(\frac{\tau}{1}\right)\right] \quad (2.3)$$

3.0 Sine-BOC(n,n) DLL Discriminator Derivation

Considering the symmetry and shape of the new synthesized correlation function, in a preferred embodiment, the invention may comprise different type of derived discriminators. Two types of DLL discriminators are considered herein, referred to as the modified EMLP and Dot-Product (DP) discriminators, as examples of possible discriminators resulting from the use of the combination of the BOC autocorrelation function, and of the BOC/PRN correlation function.

3.1 The Early-Minus-Late-Power Discriminator

A modified EMLP code tracking discriminator, extrapolated from a conventional discriminator for a standard sine-BOC(1,1) tracking, may be suitable with the present invention.

In order to formulate the discriminator, ideal expressions of the sine-BOC(1,1) autocorrelation and BOC/PRN correlation functions are given in the central region. For this purpose, assuming that the code tracking error, $\epsilon_\tau$, is smaller than half the spacing $C_S$ between the early and late correlators, the discrimination function, in the absence of filtering and noise, can then be rewritten as follows using equation (1.1):

$$R_{BOC}(\tau) = 1 - 3|\tau| \text{ for } |\tau| \leq \frac{1}{2} \quad (3.1)$$

Similarly, $R_{BOC/PRN}(\tau)$ can be expressed as:

$$R_{BOC/PRN}(\tau) = -\tau \text{ for } |\tau| \leq \frac{1}{2} \text{ (sine phasing)} \quad (3.2)$$

Assuming that $V_{EMLP}^{BOC/PRN}$ is the output of the modified EMLP discriminator, it follows that:

$$V_{EMLP}^{BOC/PRN}(\varepsilon_\tau) = \qquad (3.3)$$
$$\begin{pmatrix} [[IE_{BOC}^2 + QE_{BOC}^2] - [IL_{BOC}^2 + QL_{BOC}^2]] - \\ \beta[[IE_{BOC/PRN}^2 + QE_{BOC/PRN}^2] - [IL_{BOC/PRN}^2 + QL_{BOC/PRN}^2]] \end{pmatrix}$$

The EMLP discrimination function can then be expressed as:

$$V_{EMLP}^{BOC/PRN}(\varepsilon_\tau) = \qquad (3.4)$$
$$\frac{A^2}{4}\left( \begin{bmatrix} R_{BOC}\left(\varepsilon_\tau + \frac{C_S}{2}\right)^2 - R_{BOC}\left(\varepsilon_\tau - \frac{C_S}{2}\right)^2 \end{bmatrix} - \\ \beta\left[ R_{BOC,PRN}\left(\varepsilon_\tau + \frac{C_S}{2}\right)^2 - R_{BOC,PRN}\left(\varepsilon_\tau - \frac{C_S}{2}\right)^2 \right] \right)$$

So, assuming $$-\frac{C_s}{2} \leq \varepsilon_\tau \leq \frac{C_s}{2},$$

the final expression of the modified EMLP discriminator is given by:

$$V_{EMLP}^{BOC/PRN}(\varepsilon_\tau) = \frac{A^2}{4}((18-\beta)C_S - 12)\varepsilon_\tau \qquad (3.5)$$
$$\text{for } -\frac{C_s}{2} \leq \varepsilon_\tau \leq \frac{C_s}{2}$$

In a preferred embodiment, normalizing the discriminator is necessary to estimate the amplitude term in the discriminator. However, it is preferred to make sure that this normalization does not limit the stability domain of the discriminator. It is further preferred to have a normalized discriminator with a 'correct' response for a code tracking error as large as possible. The examples of normalizations given hereafter use a combination of the BOC autocorrelation function and the BOC/PRN correlation function.

In one embodiment, the normalization of the modified EMLP discriminator is based on the same method as used by the conventional sine-BOC(1,1) EMLP discriminator:

$$NORM1 = \qquad (3.6)$$
$$\begin{pmatrix} [(IE_{BOC} + IL_{BOC})^2 + (QE_{BOC} + QL_{BOC})^2] + \\ [(IE_{BOC/PRN} + IL_{BOC/PRN})^2 + (QE_{BOC/PRN} + QL_{BOC/PRN})^2] \end{pmatrix}$$

It leads to the following output expression:

$$V_{NORM1}(\varepsilon_\tau) = \frac{(2-3C_S)^2 V_{EMLP}}{((18-\beta)C_S - 12)NORM1} \qquad (3.7)$$
$$\text{for } -\frac{C_s}{2} \leq \varepsilon_\tau \leq \frac{C_s}{2}$$

In an alternative embodiment, a second expression uses the same normalization as the standard sine-BOC(1,1) tracking normalization:

$$NORM = [(IE_{BOC} + IL_{BOC})^2 + (QE_{BOC} + QL_{BOC})^2] \qquad (3.8)$$

which gives the following normalized output:

$$V_{NORM2}^{BOC/PRN}(\varepsilon_\tau) = \frac{(2-3C_S)^2 V_{EMLP}^{BOC/PRN}}{((18-\beta)C_S - 12)NORM2} \qquad (3.9)$$
$$\text{for } -\frac{C_s}{2} \leq \varepsilon_\tau \leq \frac{C_s}{2}$$

In another embodiment, the normalization comprises a modified version of expression (3.6), but takes into account the anti-symmetrical property of the BOC/PRN correlation function:

$$NORM3 = \qquad (3.10)$$
$$\begin{pmatrix} [(IE_{BOC} + IL_{BOC})^2 + (QE_{BOC} + QL_{BOC})^2] + \\ [(IE_{BOC/PRN} - IL_{BOC/PRN})^2 + (QE_{BOC/PRN} - QL_{BOC/PRN})^2] \end{pmatrix}$$

The normalized discriminator output then becomes:

$$V_{NORM3}^{BOC/PRN}(\varepsilon_\tau) = \frac{(4 - 12C_S + 10C_S^2)V_{EMLP}^{BOC/PRN}}{((18-\beta)C_S - 12)NORM3} \qquad (3.11)$$
$$\text{for } -\frac{C_s}{2} \leq \varepsilon_\tau \leq \frac{C_s}{2}$$

Figure 8:
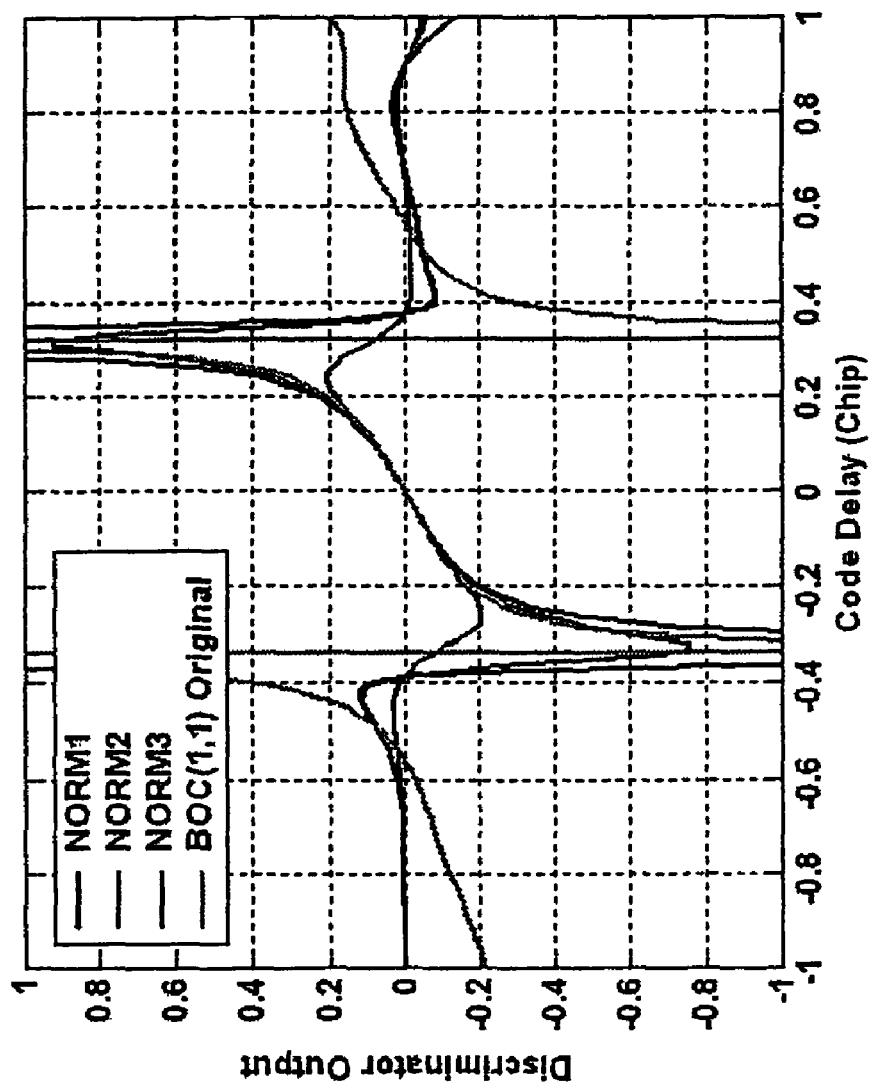
FIG. 8 shows the output of a synthesized EMLP Discriminator Output for the three proposed normalizations, and for the original normalized BOC(1,1) EMLP discriminator for an early-late spacing of 0.2 chips (6 MHz Double-Sided Front-End Filter)

FIG. 8 shows the output of each of the three normalized modified EMLP discriminators (for β=1) described as well as the output of the standard normalized sine-BOC(1,1) discriminator for an early-late spacing of 0.2 chips and a front-end filter of 6 MHz (double-sided). Unlike the standard sine-BOC(1,1) discriminator that has a false lock point, there is no such potential problem for the three exemplary new discriminators for usual $C/N_0$ values. For high $C/N_0$, there is a potential problem at ±0.65 chips as the discriminator output slightly crosses the y-axis 'in the right direction'. This problem can be easily removed by slightly increasing the parameter β, or by choosing a larger front-end filter.

The three exemplary normalizations may lead to different tracking performances due to their impact on the discriminator output shape. The first normalization NORM1 may have weaker performance compared to the two others due to its quick return to 0 when the code tracking error becomes greater than 0.2 chips. The two other normalizations, NORM2 and NORM3, have similar responses and have stability areas slightly greater than the standard sine-BOC(1,1) EMLP discriminator: [−0.38; 0.38] chips compared to [−0.33; 0.33] chips. Accordingly, the modified EMLP discriminator of the present invention using one of NORM2 and NORM3 will have a slightly larger resistance to tracking errors than pure BOC(1,1) tracking.

3.2 Dot-Product (DP) Typer of Discrimination

One alternative discriminator to the modified EMLP discriminator comprises a modified DP discriminator adapted to the novel sine-BOC(n,n) tracking technique of the present invention.

The expression of the modified DP is given by:

$$V_{DP}^{BOC/PRN}(\varepsilon_\tau) = \begin{pmatrix} (IE_{BOC} - IL_{BOC})IP_{BOC} + (QE_{BOC} - QL_{BOC})QP_{BOC} - \\ \beta \begin{pmatrix} (IE_{BOC/PRN} - IL_{BOC/PRN})IP_{BOC/PRN} + \\ (QE_{BOC/PRN} - QL_{BOC/PRN})QP_{BOC/PRN} \end{pmatrix} \end{pmatrix} \quad (3.12)$$

In that case, using the expressions for the correlator outputs, in the absence of noise, we have:

$$V_e(\varepsilon_\tau) = \frac{A^2}{4}\left[R_{BOC}\left(\varepsilon_\tau + \frac{C_S}{2}\right) - R_{BOC}\left(\varepsilon_\tau - \frac{C_S}{2}\right)\right]R_{BOC}(\varepsilon_\tau) - \frac{A^2}{4}\beta\left[R_{BOC,PRN}\left(\varepsilon_\tau + \frac{C_S}{2}\right) - R_{BOC,PRN}\left(\varepsilon_\tau - \frac{C_S}{2}\right)\right]R_{BOC,PRN}(\varepsilon_\tau) \quad (3.13)$$

Using the above models for BOC and BOC-PRN correlation functions, the following discriminator is arrived at:

$$V_{DP}^{BOC/PRN}(\varepsilon_\tau) = \frac{A^2}{4}(6(1 - 3|\varepsilon_\tau|) + \beta C_S)\varepsilon_\tau \quad (3.14)$$

As may be seen, this discriminator does not have a linear variation as a function of the code tracking error $\varepsilon_\tau$ which decreases the linearity domain of the discriminator.

Many normalizations may be implemented for the DP discriminator. When considering the DP discriminator in a traditional sine-BOC(1,1) signal tracking application, an interesting aspect of the normalization is that it can help remove the multiplicative terms preventing a non-linear variation of the discriminator. However, in the case of the present tracking invention, this is difficult since the strict multiplicative term $(6(1-3|\varepsilon_\tau|)+\beta C_S)$ is difficult to synthesize on its own.

One exemplary DP normalization is given by:

$$NORM1 = \begin{pmatrix} [(IE_{BOC} + IL_{BOC})IP_{BOC} + (IE_{BOC} + IL_{BOC})IP_{BOC}] + \\ \begin{bmatrix} (IE_{BOC/PRN} + IL_{BOC/PRN})IP_{BOC/PRN} + \\ (IE_{BOC/PRN} + IL_{BOC/PRN})IP_{BOC/PRN} \end{bmatrix} \end{pmatrix} \quad (3.15)$$

$$NORM1 = \frac{A^2}{4}\left[R_{BOC}\left(\varepsilon_\tau + \frac{C_S}{2}\right) + R_{BOC}\left(\varepsilon_\tau - \frac{C_S}{2}\right)\right]R_{BOC}(\varepsilon_\tau) + \frac{A^2}{4}\left[R_{BOC,PRN}\left(\varepsilon_\tau + \frac{C_S}{2}\right) + R_{BOC,PRN}\left(\varepsilon_\tau - \frac{C_S}{2}\right)\right]R_{BOC,PRN}(\varepsilon_\tau) \quad (3.16)$$

$$NORM1 = \frac{A^2}{4}([2 - 3C_S](1 - 3|\varepsilon_\tau|) + 2\varepsilon_\tau^2) \quad (3.17)$$

and for $\varepsilon_\tau \approx 0$ $$NORM1 = \frac{A^2}{4}[2 - 3C_S] \quad (3.18)$$

The most important term in this normalization is the first term in (3.17) depending on the value we would like to cancel $$\left(1 - \frac{3|\varepsilon_\tau|}{T_c}\right),$$

as the second term depends on the squared value of $\varepsilon_\tau$, which can be neglected.

$$V_{DP}^{NORM1}(\varepsilon_\tau) = \frac{(2 - 3C_S)V_{DP}^{BOC/PRN}}{(6 + \beta)NORM1} \quad (3.19)$$

Another possible DP normalization is derived from the conventional sine-BOC(1,1) DP normalization and is given by:

$$NORM_2 = [(IE_{BOC} + IL_{BOC})IP_{BOC} + (QE_{BOC} + QL_{BOC})QP_{BOC}] \quad (3.20)$$

$$NORM2 = \frac{A^2}{4}[2 - 3C_S](1 - 3|\varepsilon_\tau|) \quad (3.21)$$

In this example, this normalization depends on the signal power and on $$\left(1 - \frac{3|\varepsilon_\tau|}{T_c}\right),$$

which is a perfect cancellation of the undesired terms in the classical sine-BOC(1,1) DP discriminator. However, concerning the modified DP discriminator, it does not cancel out completely the quadratic error.

The resulting expression is:

$$V_{DP}^{NORM2}(\varepsilon_\tau) = \frac{(2 - 3C_S)V_{DP}^{BOC/PRN}}{(6 + C_S)NORM2} \quad (3.22)$$

Yet another possible DP normalization uses only the prompt values of the BOC autocorrelation function:

$$NORM3 = \lfloor IP_{BOC}^2 + Q_{BOC}^2 \rfloor \quad (3.23)$$

$$NORM3 = \frac{A^2}{4}(1 - 3|\varepsilon_\tau|)^2 \quad (3.24)$$

This example of normalization depends on the signal power, but will not remove the terms preventing a non-linear evolution of the discriminator:

$$V_{DP}^{NORM3}(\varepsilon_\tau) = \frac{V_{DP}^{BOC/PRN}}{(6 + C_S)NORM3} \quad (3.25)$$

The last DP normalization disclosed herein uses a modified version of DP NORM3:

$$NORM4 = \lfloor IP_{BOC}^2 + QP_{BOC}^2 + IP_{BOC/PRN}^2 + QP_{BOC/PRN}^2 \rfloor \quad (3.26)$$

$$NORM4 = \frac{A^2}{4}(1 - 6|\varepsilon_\tau| + 10\varepsilon_\tau^2) \quad (3.27)$$

$$V_e(\varepsilon_\tau) = \frac{V_{DP}^{BOC/PRN}}{(6 + C_S)NORM4} \quad (3.28)$$

Figure 9:
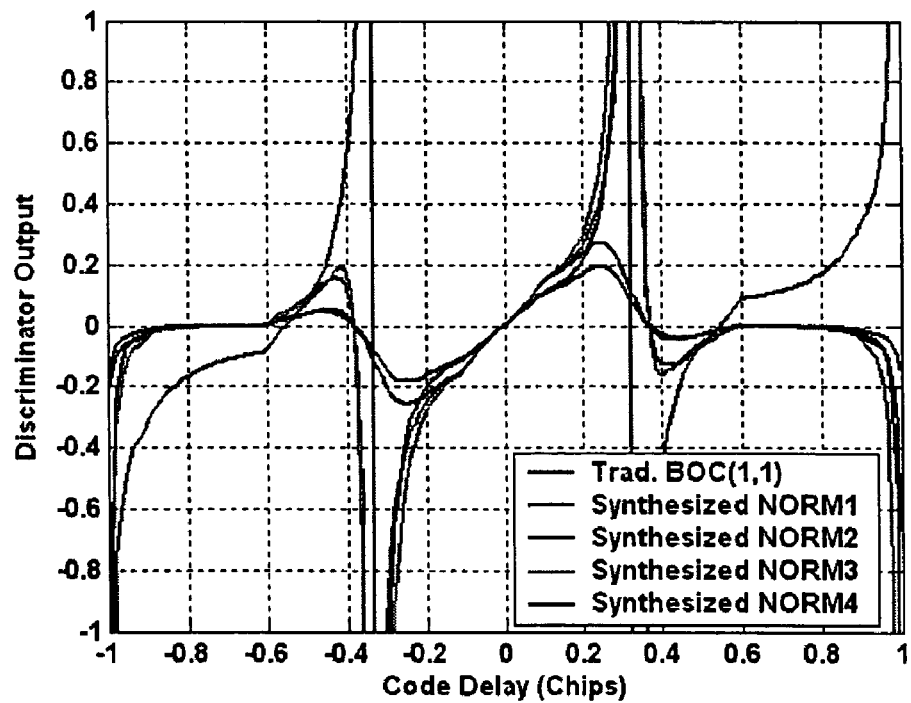
FIG. 9 shows the output of a dot-product discriminator using the four different proposed normalizations (Double-Sided Front-End BW=50 MHz, Chip Spacing=0.2 Chips FIG. 10 shows the tracking response of the standard BOC (1,1) tracking, and the synthesized BOC(1,1) tracking using NORM2 and NORM3 with an initial code delay of 0.5 chips for a $C/N_0$=40 dB-Hz (10 Hz PLL, 1 Hz DLL, PLL-aided DLL, 1 ms integration time)

Having described four exemplary DP normalizations, their comparison can be made. FIG. 9 show the discriminator output for each case, considering a 50 MHz front-end filter bandwidth (double-sided), and including the traditional normalized sine-BOC(1,1) DP discriminator.

As seen in FIG. 9, each of the DP normalizations removes the false lock point situated around 0.56 chips. As for the EMLP however, there is a potential remaining threat at a code delay of 0.6 chips for high $C/N_0$, when limited front-end filter bandwidths are used. This can be solved by increasing slightly the value of the parameter $\beta$. The characteristics of each normalization considered are very different:

DP NORM1 offers a limited response when the code delay error approaches the edge of the stability domain;

DP NORM4 does not need any extra complex correlators which is a strong implementation advantage, however, its output on the edge of the stability domain is weak and might offer less stability when the noise level is high;

DP NORM2 has a large linearity domain in the stability region compared to NORM3 and NORM4. However, one more complex correlator is required for the normalization, as both BOC/BOC early and late correlators output are needed independently.

DP NORM3 seems more adapted in this sense, as it uses only the prompt correlator's output, and as these values are needed anyway for the PLL, it does not increase the requirement in terms of correlators.

Accordingly, DP NORM2 and DP NORM3 are preferred normalizations for the methods of the present invention using a DP discriminator. It has the same characteristic stability domain as the normalized EMLP discriminator described above.

3.3 Requirements in Terms of Complex Correlators:

For the EMLP discriminator described herein, with the novel sine-BOC(1,1) unambiguous tracking method described herein, 5 complex correlators are needed:

Early$_{BOC}$, Late$_{BOC}$, Prompt$_{BOC}$ (needed for the PLL), Early$_{BOC/PRN}$, Late$_{BOC/PRN}$ The same 5 complex correlators are required for a DP discriminator with new BOC(1,1) unambiguous tracking and normalization DP NORM2. If normalization DP NORM3 is used, 4 complex correlators are needed:

(Early-Late)$_{BOC}$, Prompt$_{BOC}$ (needed for the PLL), (Early-Late)$_{BOC/PRN}$, Prompt$_{BOC/PRN}$ For the DP with traditional BOC(1,1) tracking using a bump-jumping technique and normalization DP NORM3, 4 complex correlators are needed:

(Early-Late)$_{BOC}$, Prompt$_{BOC}$ (needed for the PLL), Very-Early$_{BOC}$, VeryLate$_{BOC}$ Therefore, the signal tracking method using a DP discriminator normalized by DP NORM3, does not increase the requirements in terms of complex correlators.

3.4 Implementation of the Sine-BOC(1,1) Acquisition and Tracking Method

Figure 7A:
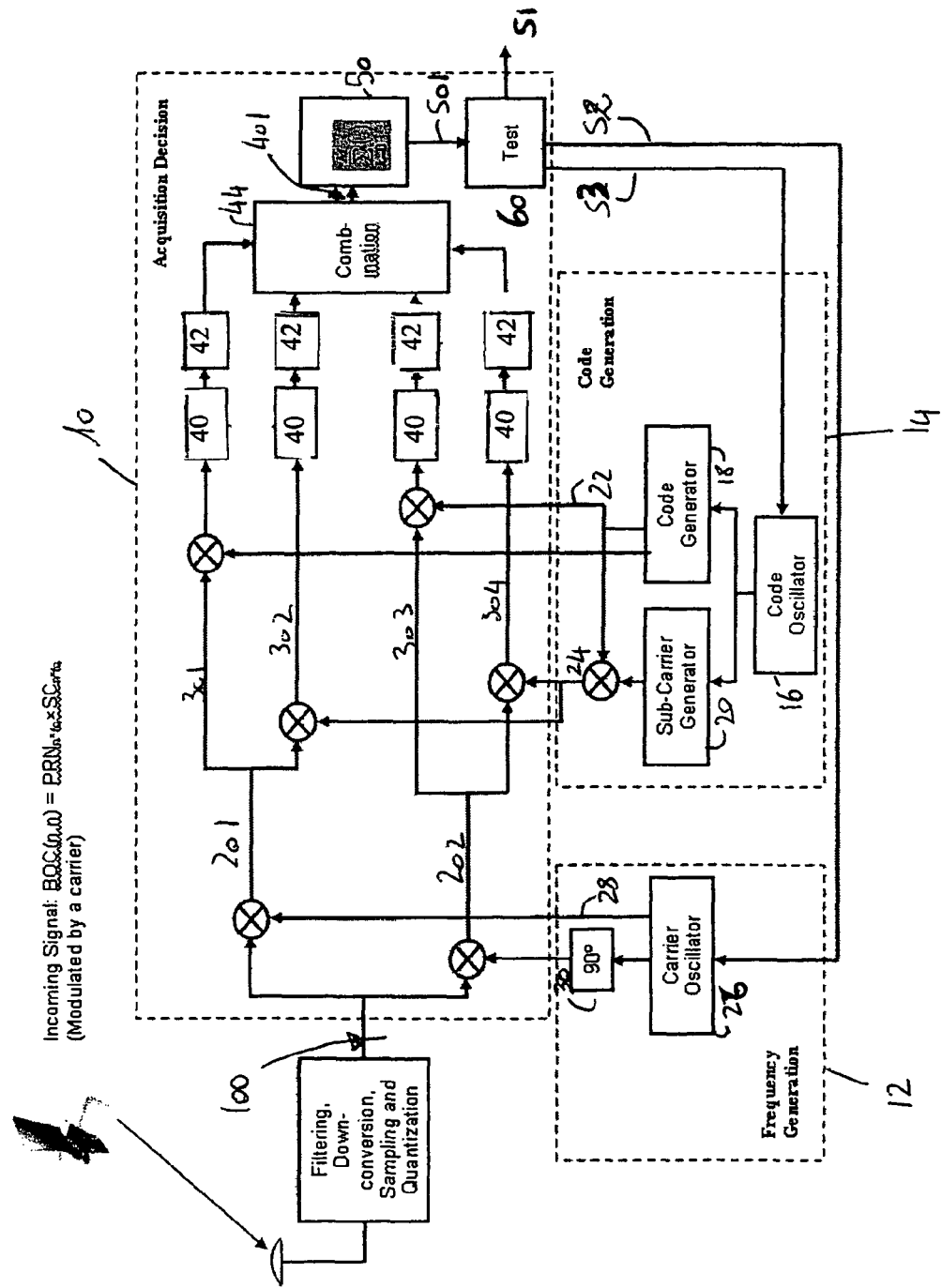
FIG. 7A shows a schematic depiction of an acquisition structure implementing a method of the present invention.

As shown in FIG. 7A, in acquisition mode, one embodiment of a satellite receiver comprises an acquisition decision device (10) having a first input (100) and three outputs (S1, S2, S3). A frequency generator (12) and a code generator (14) provide inputs to the acquisition decision device (10). The satellite signal is received on the first input (100), following filtering, down-conversion, sampling and quantization.

The acquisition decision device (10) outputs either a positive acquisition decision (S1), or a negative decision. If the acquisition decision is negative, the device (10) outputs the next set of frequency (S2) and code delay (S3) for trial.

In the code generator (14), the code oscillator (16) receives the code delay (S3) to use for the next acquisition trial. This code oscillator (16) drives the code generator (18) and the sub-carrier generator (20). The code generator (18) outputs a code replica (22) with the correct code delay received from (S3). The sub-carrier generator (20) outputs the sub-carrier with the correct code delay received from (S3) that is then multiplied with the code replica (22) to provide the BOC replica (24) with the correct code delay (S3).

In the frequency generator (12), the carrier oscillator (26) receives the frequency (S2) to use for the next acquisition trial and outputs a carrier signal (28) and a carrier signal phase-shifted by 90° (30).

The incoming signal (100) is multiplied by the carrier signal on a first secondary channel (201) and by the quadrature carrier signal on the second secondary channel (202). Each of the secondary channels is then split into two tertiary channels.

The first tertiary channel (301) results from the first secondary channel (201) and is multiplied by the code replica signal (22). The second tertiary channel (302) is multiplied by the BOC replica signal (24). The third tertiary channel (303) results from the second secondary channel (202) and is multiplied by the code replica signal (22). The fourth tertiary channel (304) is multiplied by the BOC replica signal (24).

The signals obtained on each of the four tertiary channels is processed by an integrate and dump device (40), then processed by a squaring device (42) and then combined by a combination device (44) by means of reproducing the synthesized correlation function described herein. The combination device outputs a synthesized correlation value (401) that is input in a summation device (50) that accumulates several synthesized correlation values before outputting the acquisition test value (501). This acquisition test value (501) is then input in the decision test device (60) that takes the decision of declaring successful acquisition (S1) or continuing the acquisition process with the next frequency (S2) and code delay (S3).

Figure 7B:
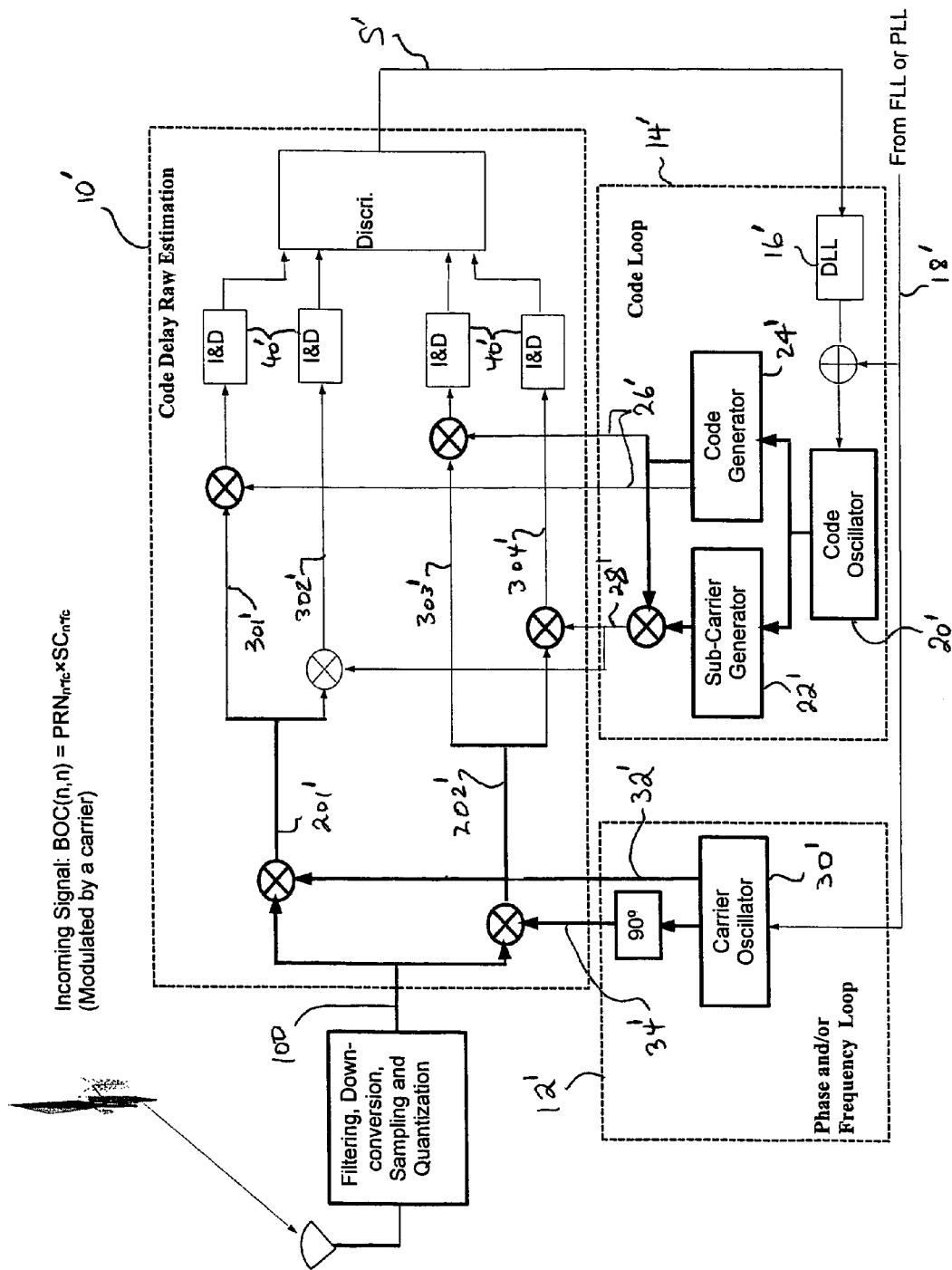
FIG. 7B shows a schematic depiction of a tracking structure implementing a method of the present invention.

Once the signal is acquired, the device may go into tracking mode, as described herein. FIG. 7B illustrates a receiver tracking structure of one embodiment of the present invention. The device comprises a receiver comprising a code delay estimation device (10') having a first input (100) and an output (S'). A phase and/or frequency lock loop (12') and a code loop (14') provide inputs to the code delay estimation device (10'). The satellite signal is received on a first input (100), following filtering, down-conversion, sampling and quantization.

The code delay estimation device (10') outputs discrimination information (S') which is used by the code loop (14'). Specifically, the Delay Lock Loop or DLL (16') which operates as a code corrector, calculates the code correction information or the code Doppler estimate and adds it (with a scaling factor) to the external speed reference (18') from the PLL (or FLL), which is then used by the code oscillator (20'). The code oscillator (20') controls the sub-carrier signal generator (22') and the code signal generator (24'). The code signal generator (24') outputs an early, late and prompt spreading code replica signal (26') while the sub-carrier generator (22') outputs an early, late and prompt sub-carrier replica signal which is multiplied by the code replica (26') to produce the BOC replica signal (28').

In the phase and/or frequency lock loop (12'), the carrier oscillator (30') receives the external speed reference (18') and outputs a carrier signal (32') and a carrier signal phase-shifted by 90° (34').

The incoming signal (100) is multiplied by the carrier signal on a first secondary channel (201') and by the quadrature carrier signal on the second secondary channel (202'). Each of the secondary channels is then split into two tertiary channels.

The first tertiary channel (301') results from the first secondary channel (201') and is multiplied by the early, late and prompt code replica signals (26'). The second tertiary channel (302') is multiplied by the early, late and prompt BOC replica signals (28'). The third tertiary channel (303') results from the second secondary channel (202') and is multiplied by the early, late and prompt spreading code replicas (26'). The fourth tertiary channel (304') is multiplied by the early, late and prompt BOC replicas (28').

The signals obtained on each of the four tertiary channels is processed by an integrate and dump device (40') and the channel outputs are combined in the discriminator (42') which produces the discrimination information or raw code delay by means of the synthesized correlation function described herein.

4.0 EXAMPLES

Simulation Results

The following examples describe test results and are intended to illustrate the invention and not to limit the claimed invention.

The test results are the result of investigations into the effect of two of the main sources of error in GNSSs: thermal noise and multipath. Simulation results comparing tracking in white thermal noise the traditional sine-BOC(1,1) tracking technique and the present invention are shown.

4.1 Observed Sine-BOC(1,1) Unambiguious Tracking Performance

The normalized discriminators described herein appear to have an asymptotic behaviour at the edge of their tracking region. As a consequence, in order to avoid large tracking jumps due to large discriminator output, a cut-off value dependent upon $C_S$ may be necessary.

The PLL needs to have the correct phase information on both the in-phase and quadra-phase channels in order to consistently estimate the phase offset. As a consequence, the PLL is run using the prompt values of the standard sine-BOC(1,1) correlators. Therefore, the PLL is exactly the same as the PLL in a conventional sine-BOC(1,1) tracking system.

A first test confirmed that a discriminator of the present invention avoids any false lock points. For this example, the three different normalized EMLP discriminators described in section 3.1 were compared. The first one used the standard normalized sine-BOC(1,1) EMLP discriminator. The two others used the modified EMLP discriminators with two different normalizations: NORM 2 and NORM 3. A PLL-aided DLL was used. A cut-off value was set for the three discriminators' outputs. By using a 0.2 chip early-late spacing, the discriminator output was set to 0.4 chips whenever the actual absolute value of the absolute output was greater than 0.4 chips. The front-end filter has a double-sided bandwidth of 6 MHz. The DLL and PLL loop bandwidths were set to 1 and 10 Hz respectively. The integration time was chosen to be 1 ms and the initial code delay was set to 0.5 chips, assuming an acquisition on the side peak. The $C/N_0$ was 40 dB-Hz. The results are shown in FIG. 10.

Figure 10:
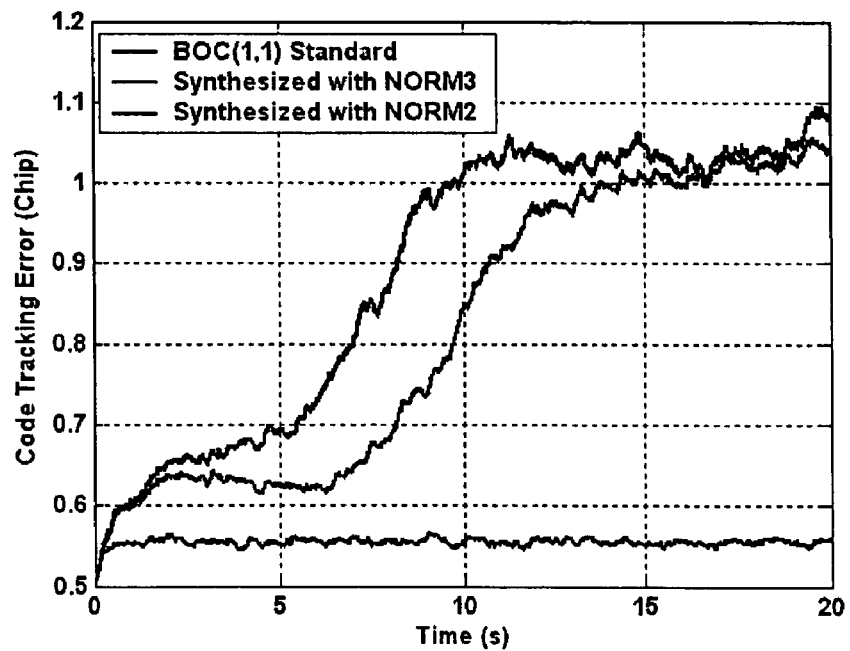

FIG. 10 shows that unlike a prior art sine-BOC(1,1) standard discriminator, the two others do not make the DLL lock on any offset stable point, confirming the results shown in FIG. 8. The use of the same PLL as in standard sine-BOC(1,1) tracking could have raised a concern as the PLL aiding uses standard sine-BOC(1,1) prompt correlation values. FIG. 10 demonstrates that the PLL does not limit the drift from the biased initial code delay, following the estimation coming from the PLL.

It is important to note again that for high $C/N_0$, and for a limited front-end filter bandwidth, there may still be a chance of tracking the secondary peak, as discussed above. To solve this problem, p can be chosen to have a value greater than 1. The minimum value to use depends on the front-end filter, but also on the early-late spacing.

Figure 11:
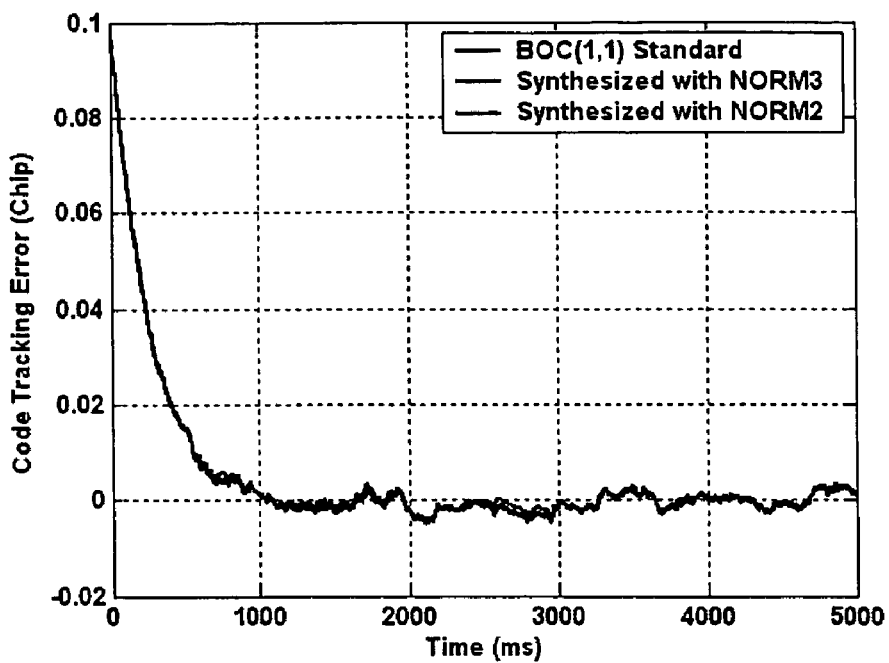
FIG. 11 shows the tracking response of the standard BOC (1,1) tracking, and the synthesized BOC(1,1) tracking using NORM2 and NORM 3 with an initial code delay of 0.1 chips for a $C/N_0$=40 dB-Hz (10 Hz PLL, 1 Hz DLL, PLL-aided DLL, 1 ms integration time)

4.2 Study of the Impacts of Thermal Noise on the Proposed Method 4.2.1 Study of the EMLP Discriminators The tests were run with the same settings as described previously. In this example, however, the initial code delay was set to 0.1 chips in order to observe the convergence toward zero, a strong clue for correct tracking, as well as to study the code tracking noise when convergence is achieved. The simulations were run over 20 seconds of simulated data. The exact same tracking parameters as the ones used to obtain FIG. 10 were chosen. FIG. 11 shows the results of one of the simulations for a signal with a $C/N_0$ of 40 dB-Hz using the EMLP discriminator implementations.

The convergence period in FIG. 11 takes approximately 1 second. The standard deviation of the code tracking error is computed for all the output obtained after two seconds of data processed in order to make sure that the values used are taken after the convergence period. For the EMLP discriminators, in order to have a reliable analysis, tests were done independently on two different software receivers: one developed by ENAC, Toulouse, France, and one developed at the University of Calgary, Canada. 12 summarizes the results obtained during the simulation campaign. For all the cases considered, convergence was obtained.

Figure 12:
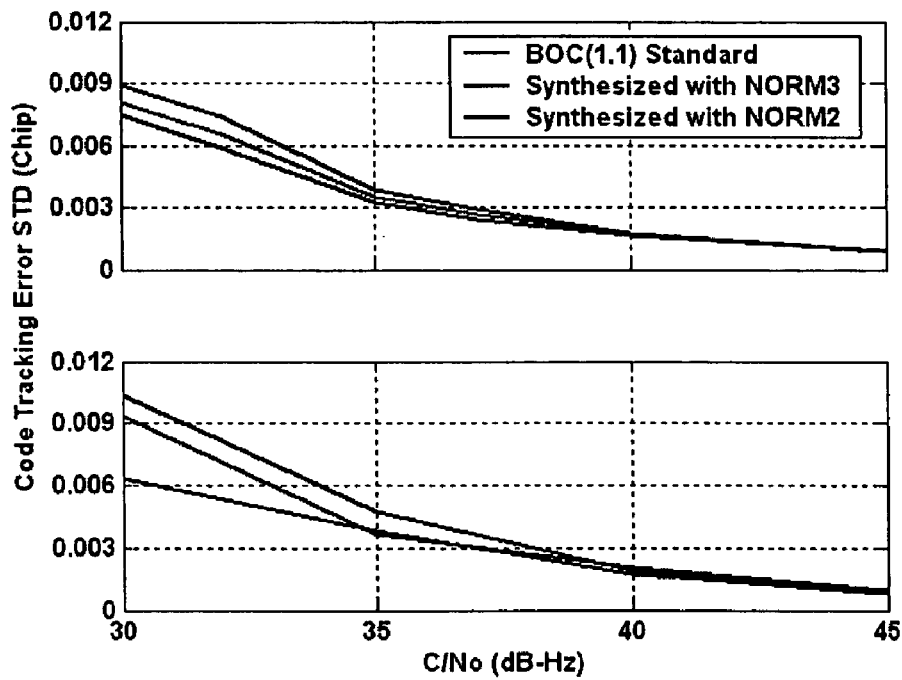
FIG. 12 shows the standard deviation of the code tracking errors for the three methods considered (10 Hz PLL, 1 Hz DLL, PLL-aided DLL, 1 ms Integration Time) for the University of Calgary (Top) and ENAC (Bottom) Simulators

FIG. 12 shows consistent results, which tends to confirm the correctness of the implementation, particularly with $C/N_o$ greater than 30 dB-Hz. Comparing the two new EMLP normalized discriminators, the one using NORM 3 appears to outperform the one using NORM2. Although the difference is very small for high $C/N_0$, it increases as the signal strength decreases. Consequently, NORM3 is a preferred normalization selected as a preferred modified EMLP discriminator.

However, its noise mitigation performance is still slightly worse than for code tracking using the standard normalized sine-BOC(1,1) discriminator. The main reason can be explained when viewing the new synthesized discriminator as the difference of two EMLP discriminators: one associated with the pure sine-BOC(1,1) autocorrelation, and the other one with the BOC/PRN correlation. This linear combination brings extra noise that is partially cancelled by the correlation of both pairs' noise values. However, there is still extra noise entering the tracking loops. The ratio between the code tracking error standard deviations is between 1.07 and 1.22 (excluding 30 dB-Hz results) according to the tests considered, which is very small. When looking at FIG. 12, this represents a loss in $C/N_0$ of less than 1 dB.

4.3.2 Study of the DP Discrimination

Using the exact same settings, the performance of the normalized DP discriminators has been compared with the conventional sine-BOC(1,1) DP discriminator using also DP NORM2 and DP NORM3 as a normalization. The tests were based on a 20 second signal. The results are shown in Table 4.1.

TABLE 4.1

Standard Deviation of the Code Tracking Error for Different C/N₀ for the Different DP Tracking Techniques

| C/No (dB-Hz) | Traditional BOC(1,1) NORM2 | Traditional. BOC(1,1) NORM3 | DP NORM2 | DP NORM3 |
|---|---|---|---|---|
| 32 | 0.00525 | 0.00663 | 0.00678 | 0.00599 |
| 35 | 0.00312 | 0.00326 | 0.00370 | 0.00375 |

It can be seen that in the case of the traditional sine-BOC (1,1) tracking, using a DP discriminator, there is a better noise mitigation using NORM2. However, this difference between the two proposed normalizations decreases as the $C/N_0$ increases.

Concerning the novel method of the present invention, it has a slightly worse performance than traditional tracking. However, the degradation is typically less than 1 dB.

The implementation of the synthesized method, using NORM3 may easily be implemented on a sine-BOC(1,1) platform by those skilled in the art as it uses the same number of complex correlators as the traditional DP (when bump jumping (Fine and Wilson, 1999) is implemented) and does not require extra computations.

4.3 Sine -BOC(1,1) Mutipath Mitigation Performance

Another important performance parameter when studying a tracking technique is its inherent resistance to multipath. Although only the EMLP discriminator will be discussed in this section, one skilled in the art will realize the results can be directly transposed to the DP case.

Figure 13:
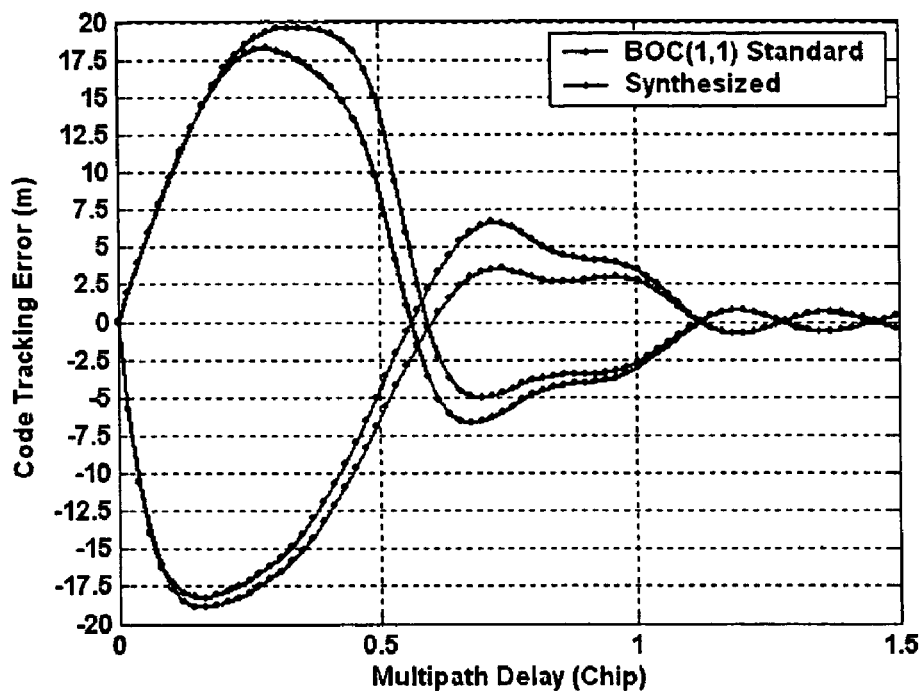
FIG. 13 shows the Multipath Envelopes for the Standard BOC(1,1) and new Synthesized EMLP Discriminators (Beta=1) for a Single Multipath with Half the Power of the Direct Signal and an Early-Late Spacing of 0.2 Chips (6 MHz Double-Sided Front-End Filter)
Figure 14:
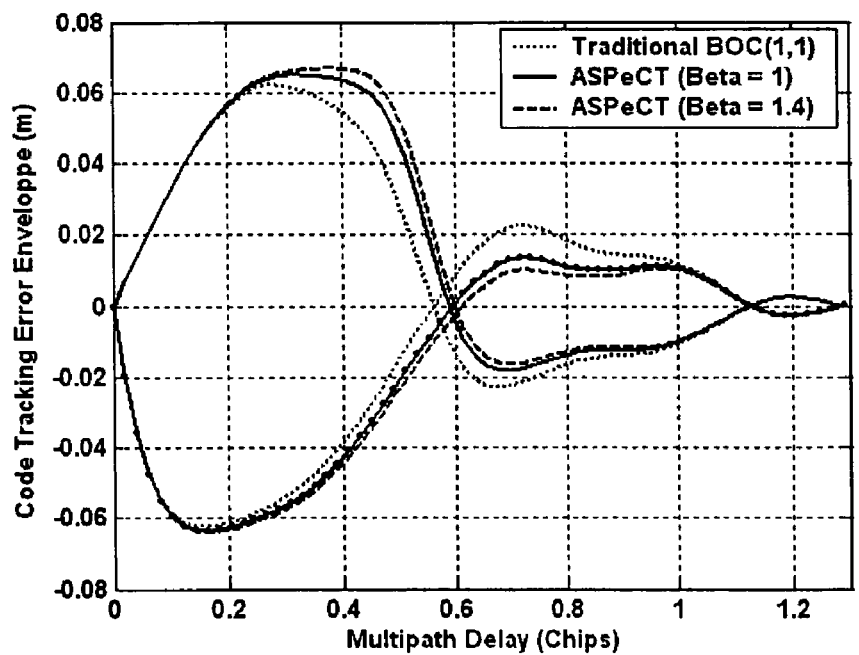
FIG. 14 shows the Multipath Envelopes for the Standard BOC(1,1) and new Synthesized EMLP Discriminators (Beta=1 and 1.4) for a Single Multipath with Half the Power of the Direct Signal and an Early-Late Spacing of 0.2 Chips (6 MHz Double-Sided Front-End Filter)

As discussed above, the synthesized correlation function has a support function smaller than that of the sine-BOC(1,1) autocorrelation function. In the ideal case of infinite bandwidth, it has non-zero values only within ±0.5 chips. However, due to the use of a non-linear combination of correlators' output to form the discriminators, it does not imply that the impact of long delay multipath is cancelled. FIG. 13 shows the multipath envelope of the standard and synthesized EMLP discriminators (for β=1) for a received multipath of half the direct signal amplitude and an early-late spacing of 0.2 chips. The front-end filter used has a 6 MHz double-sided bandwidth. The multipath envelope of a novel method of the present invention has the same shape as the one of the traditional sine-BOC(1,1) tracking method. However, they have two main differences: (1) the first lobe of the new method is slightly wider for multipath delays between 0.25 and 0.55 chips; (2) the second lobe for the new tracking method is narrower, implying a better multipath rejection for long delay multipath. It has to be noticed that the choices of the front-end filter bandwidth and of the early-late spacing have an impact in the magnitude of the difference between the two methods. However, it gives the same general shape. The new synthesized method appears to offer good resistance to long delay multipath while giving reliable measurements. The use of slightly greater parameter β does not modify the general shape of the multipath envelope, as shown in FIG. 14. It is also important to note two drawbacks of the traditional sine-BOC (1,1) tracking technique when multipath are present. First, the multipath envelope plotted in FIG. 13 is not realistic, as it assumes a correct tracking which might not be occurring. Secondly, it has to be noticed that using the traditional method, it is possible that a strong multipath creates an interfering correlation peak that is higher or as high as the secondary peak of the sine-BOC(1,1) autocorrelation function. In such a case, if the receiver is tracking the secondary peak, this can dangerously mislead the receiver.

5.0 Demonstration of the Sine-BOC(1,1) Acquisition Method

As demonstrated herein, the stability domain of a novel discriminator of the present invention is slightly greater than the one associated with the standard EMLP sine-BOC(1,1) discriminator. Its tracking performance is quasi-equivalent to standard sine-BOC(1,1) tracking. Finally, it has a better inherent mitigation of long-delay multipath. However, if the initial tracking error is greater than approximately 0.35 chips the discriminator will not be able to converge toward zero code delay, and the loop will lose lock. Note that the behavior of pure sine-BOC(1,1) tracking in that case would be to slide to a false lock point as presented in the first section. This means that in order to make sure that the receiver using the new tracking technique succeeds in tracking the incoming signal it has to acquire the signal relatively close to the main peak. As already seen, this may be a problem when using a conventional acquisition technique based on a search of the maximum energy using the autocorrelation power due to the presence of the side peaks. For this reason, an investigation of an acquisition technique using the synthesized correlation function is done hereafter.

The following assess the performance of the new acquisition scheme.

Assuming that M is the number of non-coherent summations, the signal power at the output of the synthesized correlation is given by:

$$P = \sum_{k=1}^{M} \left( (I_{BOC_k}^2 + Q_{BOC_k}^2) - (I_{BOC/PRN_k}^2 + Q_{BOC/PRN_k}^2) \right) \quad (5.1)$$

Since the noise power at each correlator's output is the same, it is possible to have the following acquisition criterion:

$$\frac{P}{\sigma_n^2} = \quad (5.2)$$

$$\sum_{i=1}^{M} \begin{bmatrix} \left( \sqrt{\frac{CT_p}{N_0}} R_{BOC}(\varepsilon_\tau) \frac{\sin(\pi f_D T_p)}{\pi f_D T_p} \cos(\varepsilon_\theta) + n_{IBOC} \right)^2 + \\ \left( \sqrt{\frac{CT_p}{N_0}} R_{BOC}(\varepsilon_\tau) \frac{\sin(\pi f_D T_p)}{\pi f_D T_p} \sin(\varepsilon_\theta) + n_{QBOC} \right)^2 - \\ \left( \sqrt{\frac{CT_p}{N_0}} R_{BOC/PRN}(\varepsilon_\tau) \frac{\sin(\pi f_D T_p)}{\pi f_D T_p} \cos(\varepsilon_\theta) + n_{IBOC/PRN} \right)^2 - \\ \left( \sqrt{\frac{CT_p}{N_0}} R_{BOC/PRN}(\varepsilon_\tau) \frac{\sin(\pi f_D T_p)}{\pi f_D T_p} \sin(\varepsilon_\theta) + n_{QBOC/PRN} \right)^2 \end{bmatrix}$$

where $\sigma_n^2$ is the variance of the correlator's output noise with power $$\frac{N_0}{4T_p};$$

is the coherent integration time; C is the signal power at the output of the receiver antenna; $n_{IBOC}$, $n_{QBOC}$, $n_{IBOC/PRN}$ and $n_{IBOC/PRN}$ are centred Gaussian noise with a unity variance; $\varepsilon_\theta$ is the phase error; and $f_D$ is the frequency error.

The acquisition criterion can be seen as the difference between two non-central Chi-square distributions. Consequently, the acquisition criterion can be defined as:

$$T_{new} = \frac{P}{\sigma_n^2} = T_{BOC} - T_{BOC/PRN} \quad (5.3)$$

where $$T_{BOC} = \sum_{k=1}^{M} \left( \left( \sqrt{\frac{CT_p}{N_0}} R_{BOC}(\varepsilon_\tau) \frac{\sin(\pi f_D T_p)}{\pi f_D T_p} \cos(\varepsilon_\theta) + n_{IBOC} \right)^2 + \left( \sqrt{\frac{CT_p}{N_0}} R_{BOC}(\varepsilon_\tau) \frac{\sin(\pi f_D T_p)}{\pi f_D T_p} \sin(\varepsilon_\theta) + n_{QBOC} \right)^2 \right) \quad (5.4)$$

and $$T_{BOC/PRN} = \sum_{k=1}^{M} \left( \left( \sqrt{\frac{CT_p}{N_0}} R_{BOC,PRN}(\varepsilon_\tau) \frac{\sin(\pi f_D T_p)}{\pi f_D T_p} \cos(\varepsilon_\theta) + n_{IBOC/PRN} \right)^2 + \left( \sqrt{\frac{CT_p}{N_0}} R_{BOC,PRN}(\varepsilon_\tau) \frac{\sin(\pi f_D T_p)}{\pi f_D T_p} \sin(\varepsilon_\theta) + n_{QBOC/PRN} \right)^2 \right) \quad (5.5)$$

Since the acquisition criterion is the difference between two Chi-square distributions, its expected value can be expressed as:

$$\langle T_{new} \rangle = \langle T_{BOC} \rangle - \langle T_{BOC/PRN} \rangle \quad (5.6)$$

It has been determined that the two distributions $T_{BOC}$ and $T_{BOC/PRN}$ can be assumed as independent when no front-end filter was used as the correlation between the two correlators' noise considered is null. Empirically, this covariance has been determined to be very low when using a front-end filter, so that:

$$\sigma_{t_{new}}^2 = \sigma_{T_{BOC}}^2 = \sigma_{T_{BOC/PRN}}^2 \quad (5.7)$$

From equations (5.6) and (5.7), it is possible to compare the mean and variance of the new acquisition criterion with the values of the standard acquisition criterion (symbolized by $T_{BOC}$). For this purpose, two figures of merit have been defined: the ratio of the means (FOM1), and the ratio of the variances (FOM2). These two figures of merit can be expressed using equations (5.4-5.7) as:

$$FOM1 = \frac{\frac{CT_p}{N_0}((R_{BOC}(\varepsilon_\tau))^2 - (R_{BOC,PRN}(\varepsilon_\tau))^2)\left(\frac{\sin(\pi f_D T_p)}{\pi f_D T_p}\right)^2}{\frac{CT_p}{N_0}(R_{BOC}(\varepsilon_\tau))^2\left(\frac{\sin(\pi f_D T_p)}{\pi f_D T_p}\right)^2 + 2} \quad (5.8)$$

and, $$FOM2 = \frac{4\frac{CT_p}{N_0}((R_{BOC}(\varepsilon_\tau))^2 - (R_{BOC,PRN}(\varepsilon_\tau))^2)\left(\frac{\sin(\pi f_D T_p)}{\pi f_D T_p}\right)^2 + 2}{\frac{CT_p}{N_0}(R_{BOC}(\varepsilon_\tau))^2\left(\frac{\sin(\pi f_D T_p)}{\pi f_D T_p}\right)^2 + 1} \quad (5.9)$$

From equations (5.6) and (5.7), it can be seen that both figures of merit favour the standard acquisition criterion. Indeed, the ratio of the means will always be smaller than 1, meaning that $\langle T_{new} \rangle$ will always be smaller than $\langle T_{BOC} \rangle$ when the same acquisition parameters are used. Similarly, FOM2 will always be greater than 1, meaning that $\sigma_{T_{new}}^2$ will always be larger than $\sigma_{T_{BOC}}^2$. Due to the relatively small value of $(R_{BOC/PRN}(\varepsilon_\tau))^2$ compared to $(R_{BOC}(\varepsilon_\tau))^2$ around $\varepsilon_\tau=0$, its impact on the acquisition performance will be small.

Figure 15:
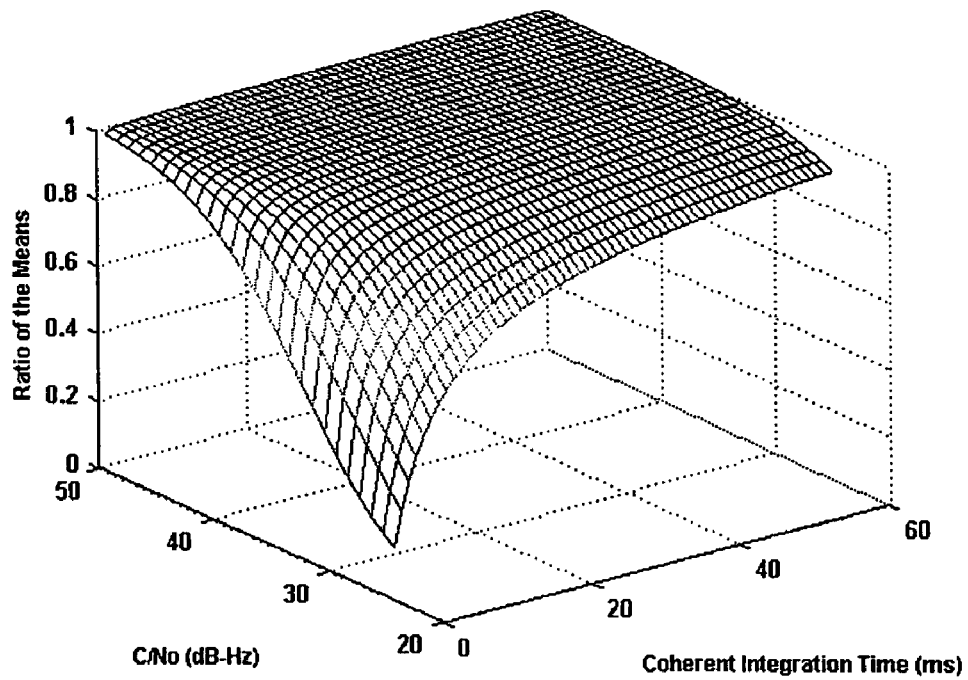
FIG. 15 illustrates the impact of the coherent integration time and the $C/N_0$ on FOM1 and FOM2

The number of non-coherent summations appears to have no impact on the two figures of merit. This means that the difference between the two criteria cannot be bridged using a large number of non-coherent summations. Equations (5.6) and (5.7) also show that the difference between the two acquisition criteria is reduced when the value of $CT_p$ increases. The impact of the $C/N_0$ and $T_p$ on the two figures of merit is represented in FIG. 15.

Knowing that the difference between two independent random variables has a distribution which is the convolution between the first variable distribution and the opposite of the second variable distribution [Papoulis, 1991], it can be written that:

$$p_{T_{new}}(x) = p_{T_{BOC}}(x) * p_{T_{BOC/PRN}}(-x) \quad (5.10)$$

where $p_\alpha$ is the distribution of the random variable $\alpha$.

Figure 16:
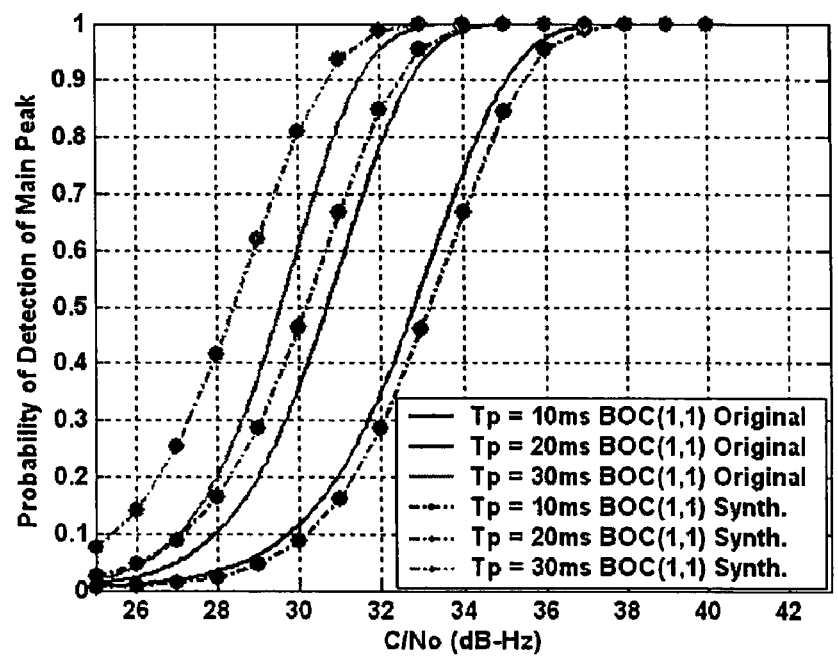
FIG. 16 illustrates the probability of detection of the main peak using the standard BOC(1,1) and the new acquisition criteria with no non-coherent summations and coherent integration times of 10, 20 and 30 ms.
Figure 17:
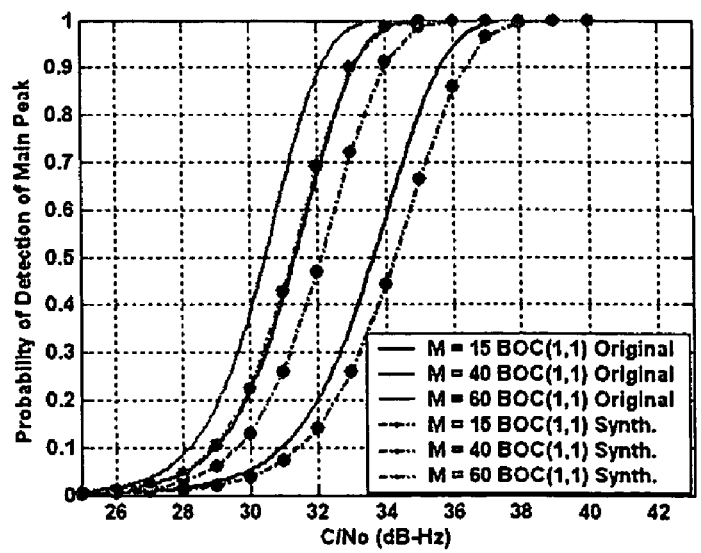
FIG. 17 illustrates the probability of detection of the main peak using the standard BOC(1,1) and the new acquisition criteria with 15, 40 and 60 non-coherent summations and a coherent integration time of 1 ms.

As a consequence, it is possible to model through simulations the distribution of $T_{new}$ as a non-central Chi-square distribution. Therefore, the probability of detection of the main peak using the new acquisition criteria can be estimated. Making the same assumptions as in the sections above, FIGS. 16 and 17 are obtained.

As expected, the coherent integration time has a greater effect on the acquisition performance than the non-coherent summation number compared to the original BOC(1,1) acquisition strategy. For long coherent integrations, the new method even outperforms the standard BOC(1,1) method. One skilled in the art may realize the importance of this as new GNSS civil signal will have a dataless channel authorizing longer coherent integrations.

REFERENCES

The following references are incorporated herein by reference as if reproduced herein in their entirety.

Bastide, F., O. Julien, C. Macabiau, and B. Roturier (2002), *Analysis of L5/E5 Acquisition, Tracking and Data Demodulation Thresholds*, Proceedings of U.S. Institute of Navigation GPS (Portland, Oreg., USA, September 24-27), pp. 2196-2207.

Betz, J. W. (2002), *Binary Offset Carrier Modulations for Radionavigation, Navigation*, Journal of the Institute of Navigation, Winter 2001-2002, Vol. 48, Number 4, pp. 227-246.

Fine, P., and W. Wilson (1999), Tracking Algorithm for GPS Offset Carrier Signals, Proceedings of U.S. Institute of Navigation NTM (San Diego, Calif., USA, January 25-27), pp. 671-676.

Gibbon, G (2004), *Welcome Progress in GNSS Talks*, GPS World, February issue.

Godet, J., J. C. de Mateo, P. Erhard, and O. Nouvel (2002), *Assessing the Radio Frequency Compatibility between GPS and Galileo*, Proceedings of U.S. Institute of Navigation GPS (Portland, Oreg., USA, September 24-27), pp.1260-1269.

Lin, V. S, P. A. Dafesh, A. Wu, and C. R. Cahn (2003), *Study of the Impact of False Lock Points on Subcarrier Modulated Ranging Signals and Recommended Mitigation Approaches*, Proceedings of U.S. Institute of Navigation AM (Albuquerque, N.M., USA, June 23-25), pp. 156-165.

Martin, N., V. Leblond, G. Guillotel, and V. Heiries (2003), BOC(x,y) *Signal Acquisition Techniques and Performances*, Proceedings of U.S. Institute of Navigation GPS/GNSS (Portland, Oreg., USA, September 9-12), pp.188-198.

Papoulis, A. (1991), *Probability, Random Variables and Stochastic Processes*, Third Edition, McGraw Hill International Editions.

Ward, P. (2004), *A Design Technique to Remove the Correlation Ambiguity in Binary Offset Carrier* (BOC) *Spread*

Spectrum Signals (Revised Version), Proceedings of U.S. Institute of Navigation NTM (San Diego, Calif., USA, January 26-28), pp. 886-896.

What is claimed is:

1. A method of tracking a Binary Offset Carrier (BOC) signal with a satellite navigation receiver, comprising the steps of:
   (a) receiving a BOC signal;
   (b) generating an internal BOC replica signal;
   (c) generating an internal Pseudo Random Noise (PRN) replica signal;
   (d) providing a discriminator for code delay by combining a BOC autocorrelation function and a BOC/PRN cross-correlation function, wherein the BOC/PRN cross-correlation function is obtained without using a locally generated BOC sub-carrier signal.

2. A method of acquiring a Binary Offset Carrier (BOC) signal with a satellite navigation receiver comprising the steps of:
   (a) receiving a BOC signal;
   (b) generating an internal BOC replica signal;
   (c) generating an internal Pseudo Random Noise (PRN) replica signal;
   (d) obtaining a synthesized acquisition test function by combining a BOC autocorrelation function and a BOC/PRN cross-correlation function, wherein the BOC/PRN cross-correlation function is obtained without using a locally generated BOC sub-carrier signal;
   (e) if the test realized in (d) is negative, then repeating steps (b) to (d) until the test function is passed or the acquisition process is abandoned.

3. The method of claim 1 or 2 wherein the BOC signal is a sine-BOC(n,n) signal.

4. The method of claim 3 wherein the sine-BOC(n,n) signal is a sine-BOC(1,1) signal.

5. The method of claim 1 wherein the discriminator is an Early-Minus-Late-Power (EMLP) discriminator.

6. The method of claim 5 wherein the EMLP discriminator is normalized by one of NORM1, NORM2, or NORM3, wherein $$NORM1 = ([(IE_{BOC} + IL_{BOC})^2 + (QE_{BOC} + QL_{BOC})^2] +$$
$$[(IE_{BOC/PRN} + IL_{BOC/PRN})^2 + (QE_{BOC/PRN} + QL_{BOC/PRN})^2])$$
$$NORM2 = \lfloor (IE_{BOC} + IL_{BOC})^2 + (QE_{BOC} + QL_{BOC})^2 \rfloor$$
$$NORM3 = ([(IE_{BOC} + IL_{BOC})^2 + (QE_{BOC} + QL_{BOC})^2] +$$
$$[(IE_{BOC/PRN} - IL_{BOC/PRN})^2 + (QE_{BOC/PRN} - QL_{BOC/PRN})^2])$$

7. The method of claim 1 wherein the discriminator is a dot-product discriminator.

8. The method of claim 7 wherein the dot-product discriminator is normalized by one of DP NORM2 or DP NORM3, wherein $$V_{DP}^{NORM3}(\varepsilon_\tau) = \frac{V_{DP}^{BOC/PRN}}{(6+C_S)NORM3} \text{ and } V_{DP}^{NORM2}(\varepsilon_\tau) = \frac{(2-3C_S)V_{DP}^{BOC/PRN}}{(6+C_S)NORM2},$$

$$\text{where } V_{DP}^{BOC/PRN}(\varepsilon_\tau) = \frac{A^2}{4}(6(1-3|\varepsilon_\tau|)+\beta C_S)\varepsilon_\tau.$$

9. A satellite navigation receiver capable of acquiring a satellite signal, said receiver comprising:
   (a) an acquisition test function device comprising a signal input, computational means for combining the correlation points of a Binary Offset Carrier (BOC) autocorrelation function and a BOC/Pseudo Random Noise (PRN) cross-correlation function and means for outputting an acquisition test function including a test Doppler frequency and a test code delay, wherein the BOC/PRN cross-correlation function is obtained without using a locally generated BOC sub-carrier signal;
   (b) a frequency generator comprising a carrier oscillator and a quadrature carrier oscillator, having a test frequency input coupled to the acquisition test function output, and an output coupled to the acquisition test function device signal input; and
   (c) a code generator comprising a code oscillator, a code generator for generating a PRN replica, a sub-carrier generator for generating replica a BOC sub-carrier signal;
   wherein the code oscillator receives the test code delay and is coupled to the code generator and the sub-carrier generator, and
   wherein the code generator and the sub-carrier generator are each coupled to the acquisition test device.

10. The receiver of claim 9 wherein the acquisition test function device comprises:
    (a) an input channel,
    (b) first and second secondary channels split from the input channel,
    (c) first and second tertiary channels split from the first secondary channel, third and fourth tertiary channels split from the second secondary channel,
    (d) and wherein the carrier oscillator is coupled to the first secondary channel and the quadrature carrier oscillator is coupled to the second secondary channel; and
    wherein the code generator is coupled to the first tertiary channel and also coupled to the third tertiary channel; and
    wherein the sub-carrier generator is coupled to the code generator, and the product of the sub-carrier generator and the code generator is coupled to the second tertiary channel and the fourth tertiary channel.

11. The receiver of claim 10 wherein the acquisition test function device computational means comprises an integrate and dump device, a squaring device, and a synthetic correlation device.

12. The receiver of claim 10 further comprising a code delay estimation device for tracking an acquired signal using the computational means.

13. A satellite navigation receiver capable of tracking a satellite signal, said receiver comprising:
    (a) a code delay estimation device comprising a signal input, computational means for combining the correlation points of a Binary Offset Carrier (BOC) autocorrelation function and a BOC/Pseudo Random Noise (PRN) cross-correlation function and means for outputting a code delay, wherein the BOC/PRN cross-correlation function is obtained without using a locally generated BOC sub-carrier signal;
    (b) a frequency generator comprising a carrier oscillator and a quadrature carrier oscillator, having a frequency input coupled to an external speed aid, and an output coupled to the code delay estimation device signal input; and
    (c) a code generator comprising a code oscillator, a code generator for generating a PRN replica, a sub-carrier generator for generating a BOC sub-carrier signal;
    wherein the code oscillator receives the test code delay and is coupled to the code generator and the sub-carrier generator, and wherein the code generator and the sub-carrier generator are each coupled to the code delay estimation device.

14. The receiver of claim 13 wherein the sub-carrier generator generates an early, late and prompt sub-carrier replica and the code generator generates an early, late and prompt PRN replica.

15. The receiver of claim 14 further comprising an acquisition test function device.

16. The receiver of claim 13 wherein the code delay estimation device comprises:
   (a) an input channel,
   (b) first and second secondary channels split from the input channel,
   (c) first and second tertiary channels split from the first secondary channel, third and fourth tertiary channels split from the second secondary channel,
   (d) and wherein the carrier oscillator is coupled to the first secondary channel and the quadrature carrier oscillator is coupled to the second secondary channel; and
   wherein the code generator is coupled to the first tertiary channel and also coupled to the third tertiary channel; and
   wherein the sub-carrier generator is coupled to the code generator, and the product of the sub-carrier generator and the code generator is coupled to the second tertiary channel and the fourth tertiary channel.

* * * * *

UNITED STATES PATENT AND TRADEMARK OFFICE
CERTIFICATE OF CORRECTION

| | | |
|---|---|---|
| PATENT NO. | : 7,916,771 B2 | Page 1 of 1 |
| APPLICATION NO. | : 11/129482 | |
| DATED | : March 29, 2011 | |
| INVENTOR(S) | : Olivier Julien et al. | |

It is certified that error appears in the above-identified patent and that said Letters Patent is hereby corrected as shown below:

In claim 9, column 22, line 15, delete "replica".

Signed and Sealed this
Twenty-seventh Day of September, 2011

David J. Kappos
*Director of the United States Patent and Trademark Office*